(12) United States Patent
Baek et al.

(10) Patent No.: US 11,815,963 B2
(45) Date of Patent: Nov. 14, 2023

(54) ELECTRONIC DEVICE COMPRISING WIRING MEMBER FIXING STRUCTURE

(71) Applicant: Samsung Electronics Co., Ltd., Suwon-si (KR)

(72) Inventors: Seungchul Baek, Suwon-si (KR); Suman Lee, Suwon-si (KR); Hyosung La, Suwon-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 17/430,575

(22) PCT Filed: Dec. 23, 2019

(86) PCT No.: PCT/KR2019/018299
§ 371 (c)(1),
(2) Date: Aug. 12, 2021

(87) PCT Pub. No.: WO2020/171365
PCT Pub. Date: Aug. 27, 2020

(65) Prior Publication Data
US 2022/0129046 A1 Apr. 28, 2022

(30) Foreign Application Priority Data
Feb. 18, 2019 (KR) .................. 10-2019-0018848

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1652* (2013.01);
(Continued)

(58) Field of Classification Search
CPC .................................................. G06F 1/1681
See application file for complete search history.

(56) References Cited

U.S. PATENT DOCUMENTS

| 9,710,019 B2 | 7/2017 | Kwon et al. |
| 10,219,397 B2 | 2/2019 | Choi et al. |
| (Continued) | | |

FOREIGN PATENT DOCUMENTS

| CN | 106486018 U | 3/2017 |
| CN | 206195877 U | 5/2017 |
| (Continued) | | |

OTHER PUBLICATIONS

European Search Report dated Feb. 25, 2022, issued in European Application No. 19915655.5.
(Continued)

*Primary Examiner* — Mukundbhai G Patel
(74) *Attorney, Agent, or Firm* — Jefferson IP Law, LLP

(57) ABSTRACT

An electronic device comprises: a hinge structure which is arranged in an internal space of a hinge cover and includes a first hinge plate having a first opening and a second hinge plate having a second opening; a first housing connected to the first hinge plate; a second housing connected to the second hinge plate; a flexible display arranged to be supported by the first housing and the second housing; and a wiring member which electrically connects a first electrical structure of the first housing to a second electrical structure of the second housing through the internal space of the hinge cover, wherein the wiring member comprises: a bendable portion; a first fixing portion which is disposed on the first opening of the first hinge plate from the bendable portion so as to be exposable; a second fixing portion which is disposed on the second opening of the second hinge plate from the bendable portion so as to be exposable; at least one first reinforcing member which is fixed on the first fixing portion (Continued)

and is arranged to be supported by the first hinge plate between the first hinge plate and the first housing; and at least one second reinforcing member which is fixed on the second fixing portion and is arranged to be supported by the second hinge plate between the second hinge plate and the second housing.

20 Claims, 23 Drawing Sheets

(52) U.S. Cl.
CPC ........ *G06F 1/1656* (2013.01); *H04M 1/0216* (2013.01); *H04M 1/0277* (2013.01); *H04M 1/0268* (2013.01)

(56) References Cited

U.S. PATENT DOCUMENTS

| | | |
|---|---|---|
| 2006/0256960 A1 | 11/2006 | Bae et al. |
| 2012/0236484 A1 | 9/2012 | Miyake |
| 2012/0314399 A1 | 12/2012 | Bohn et al. |
| 2015/0233162 A1 | 8/2015 | Lee et al. |
| 2015/0241925 A1 | 8/2015 | Seo et al. |
| 2016/0018851 A1 | 1/2016 | Kwon et al. |
| 2016/0301150 A1 | 10/2016 | Choi et al. |
| 2017/0061836 A1 | 3/2017 | Kim et al. |
| 2018/0077793 A1 | 3/2018 | Qian |
| 2018/0324964 A1* | 11/2018 | Yoo ..................... H01Q 1/2266 |
| 2019/0033920 A1 | 1/2019 | Yun et al. |
| 2019/0163241 A1 | 5/2019 | Moon et al. |

FOREIGN PATENT DOCUMENTS

| | | |
|---|---|---|
| CN | 208401905 U | 1/2019 |
| EP | 3926934 B1 | 6/2023 |
| JP | 2011-119831 A | 6/2011 |
| JP | 2011-223110 A | 11/2011 |
| JP | 2016-144101 A | 8/2016 |
| KR | 10-2005-0039419 A | 4/2005 |
| KR | 10-2015-0096827 A | 8/2015 |
| KR | 10-2016-0121178 A | 10/2016 |
| KR | 10-1762132 B1 | 7/2017 |
| KR | 10-2018-0122210 A | 11/2018 |
| RU | 2328071 C2 | 6/2008 |
| RU | 2016137482 A | 3/2018 |
| WO | 2017-222243 A1 | 12/2017 |

OTHER PUBLICATIONS

Russian Office Action dated Apr. 27, 2022, issued in Russian Application No. 2021127336.
Russian Decision on Grant dated Jul. 26, 2022, issued in Russian Application No. 2021127336.
Chinese Office Action dated Jul. 6, 2023, issued in a Chinese Patent Application No. 201980092239.7.
Vietnamese Office Action dated Aug. 21, 2023, issued in a Vietnamese Patent Application No. 1-2021-05783.

* cited by examiner

ELECTRONIC DEVICE COMPRISING WIRING MEMBER FIXING STRUCTURE

CROSS-REFERENCE TO RELATED APPLICATION(S)

This application is a U.S. National Stage application under 35 U.S.C. § 371 of an International application number PCT/KR2019/018299, filed on Dec. 23, 2019, which is based on and claims priority of a Korean patent application number 10-2019-0018848, filed on Feb. 18, 2019, in the Korean Intellectual Property Office, the disclosure of which is incorporated by reference herein in its entirety.

TECHNICAL FIELD

Various embodiments of the disclosure relate to an electronic device including a wiring member fixing structure.

BACKGROUND ART

As a functional gap between manufacturers is remarkably reduced, electronic devices are gradually becoming slimmer in order to satisfy consumers' purchasing desires, and are being developed to increase rigidity thereof, strengthen design aspects thereof, and differentiate functional elements thereof. These electronic devices are gradually being transformed from a uniform rectangular shape into various shapes. For example, the electronic device may have a transformable structure that is convenient to carry and that can use a large-screen display when used. As a kind of such electronic devices, a foldable type electronic device has appeared.

DISCLOSURE OF INVENTION

Technical Problem

A foldable electronic device may include a hinge structure and a first housing and a second housing connected in directions opposite to each other in the hinge structure. Such a foldable electronic device may operate in an in-folding manner by rotating the first housing in a range of 0 to 180 degrees with respect to the second housing through the hinge structure or may operate in an out-folding manner by rotating in a range of 0 to 360 degrees. The foldable electronic device may include a large-screen display (e.g., flexible display) disposed to cross the first housing and the second housing while being supported by the first housing and the second housing in a state opened at 180 degrees.

A foldable housing may include at least one wiring member for electrically connecting at least one electrical element disposed in the first housing and at least one electrical element disposed in the second housing. The wiring member may include a flexible printed circuit board (FPCB) extended from the first housing to the second housing through the hinge structure. The wiring member may have a sufficient spare length to receive folding and unfolding operations of the first housing and the second housing, and such a spare portion of the wiring member may be received in at least some space of the hinge structure (e.g., hinge cover). Further, because the spare portion of the wiring member may arbitrarily move within the hinge structure according to the folding and unfolding operations of the first housing and the second housing, the wiring member may include a fixing portion for fixing the spare portion, and the fixing portion may be fixed at least partially to each housing.

However, in such a wiring member, a repulsive force may be generated inside the hinge structure according to folding and unfolding operations of the first housing and the second housing, and the fixing portion of the wiring member may be separated from the housing (e.g., support member or bracket) by such a repulsive force to press the display upward, whereby the corresponding portion may be lifted.

Furthermore, because the hinge structure does not provide a separate support structure for supporting the wiring member in an internal space, when a spare portion of the wiring member is biased to either side during initial assembly, the wiring member may be damaged by a friction with peripheral structures because of frequent folding operations and, as a result, a malfunction of the electronic device may be caused.

Various embodiments of the disclosure may provide an electronic device including a wiring member fixing structure.

According to various embodiments, the disclosure may provide an electronic device including a wiring member fixing structure capable of providing a reliable operation structure even when a frequent folding operation is performed.

According to various embodiments, the disclosure may provide an electronic device including a wiring member fixing structure capable of preventing a wiring member from being damaged because of frequent folding operations by providing a separate support structure to a spare portion of the wiring member inside a hinge structure.

Solution to Problem

According to various embodiments, an electronic device includes a foldable housing, wherein the foldable housing includes a hinge structure, wherein the hinge structure includes a hinge cover to which at least one hinge module is fixed in an internal space; a first hinge plate rotatably fixed to the hinge module and including a first opening connected to the internal space; and a second hinge plate rotatably fixed to the hinge module and including a second opening connected to the internal space, a first housing including a first surface connected to the first hinge plate and facing in a first direction, a second surface facing in a direction opposite to that of the first surface, and a first side member enclosing a first space between the first surface and the second surface; and a second housing including a third surface connected to the second hinge plate and facing in a second direction, a fourth surface facing in a direction opposite to that of the third surface, and a second side member enclosing a second space between the third surface and the fourth surface, wherein the first housing and the second housing are foldably coupled to each other along the hinge structure so as to at least partially overlap in a folded state; a flexible display disposed to at least partially cross from the first surface through the second surface; and a wiring member configured to electrically connect a first electric structure of the first space and a second electric structure of the second space through the internal space of the hinge cover, wherein the wiring member includes a bendable portion; a first fixing portion disposed to be exposed to the first opening of the first hinge plate in the bendable portion; a second fixing portion disposed to be exposed to the second opening of the second hinge plate in the bendable portion; at least one first reinforcing member fixed to the first fixing portion and disposed to receive support of the first hinge plate between the first hinge plate and the first housing; and at least one second reinforcing member fixed to the second fixing portion and disposed to receive support of the second hinge plate between the second hinge plate and the second housing.

According to various embodiments, an electronic device includes a foldable housing, wherein the foldable housing includes a hinge structure, wherein the hinge structure includes a hinge cover to which at least one hinge module is fixed in an internal space; a first hinge plate rotatably fixed to the hinge module; and a second hinge plate rotatably fixed to the hinge module, a first housing including a first surface connected to the first hinge plate and facing in a first direction, a second surface facing in a direction opposite to that of the first surface, and a first side member enclosing a first space between the first surface and the second surface; and a second housing including a third surface connected to the second hinge plate and facing in a second direction, a fourth surface facing in a direction opposite to that of the third surface, and a second side member enclosing a second space between the third surface and the fourth surface, wherein the first housing and the second housing are foldably coupled to each other along the hinge structure so as to at least partially overlap in a folded state; a flexible display disposed to at least partially cross from the first surface through the second surface; a wiring member configured to electrically connect a first electric structure of the first space and a second electric structure of the second space through the internal space of the hinge cover and including at least partially a bendable portion; and at least one support dummy formed to protrude in an area overlapped with the wiring member and disposed in the internal space of the hinge cover, when the display is viewed from above, wherein the bendable portion of the wiring member may be disposed to be supported through the at least one support dummy.

Advantageous Effects of Invention

According to various embodiments of the disclosure, because a fixing structure disposed through a peripheral structure is provided in a wiring member, a reliable operation can be induced even in a frequent folding operation of an electronic device, and a malfunction of the electronic device due to damage of the wiring member can be prevented.

BRIEF DESCRIPTION OF DRAWINGS

In connection with the description of the drawings, the same or similar reference numerals may be used for the same or similar components.

MODE FOR THE INVENTION

Figure 1:
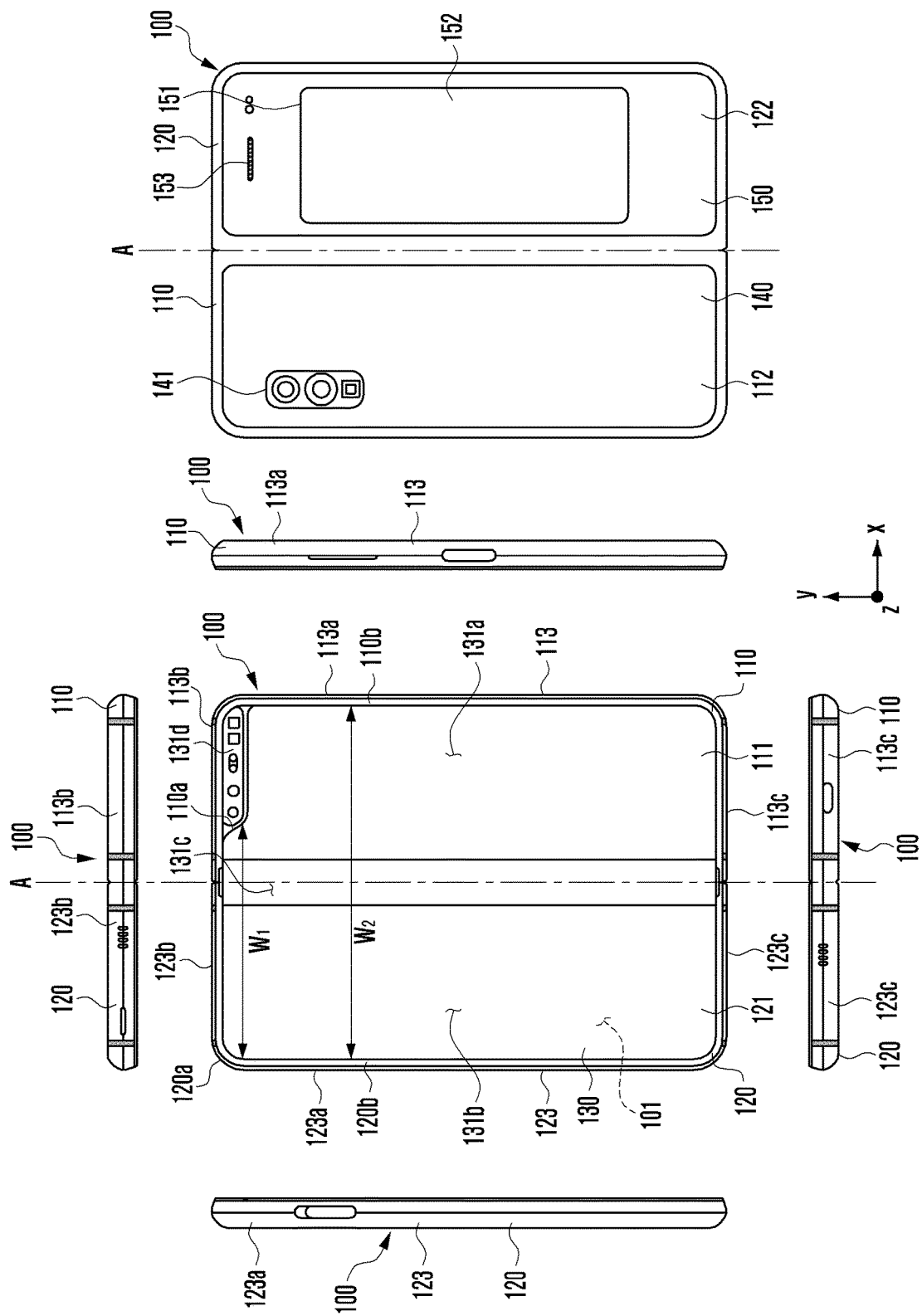
FIG. 1 is a diagram illustrating an unfolded state of an electronic device according to various embodiments of the disclosure.

FIG. 1 is a diagram illustrating an unfolded state of an electronic device according to various embodiments of the disclosure.

Figure 2:
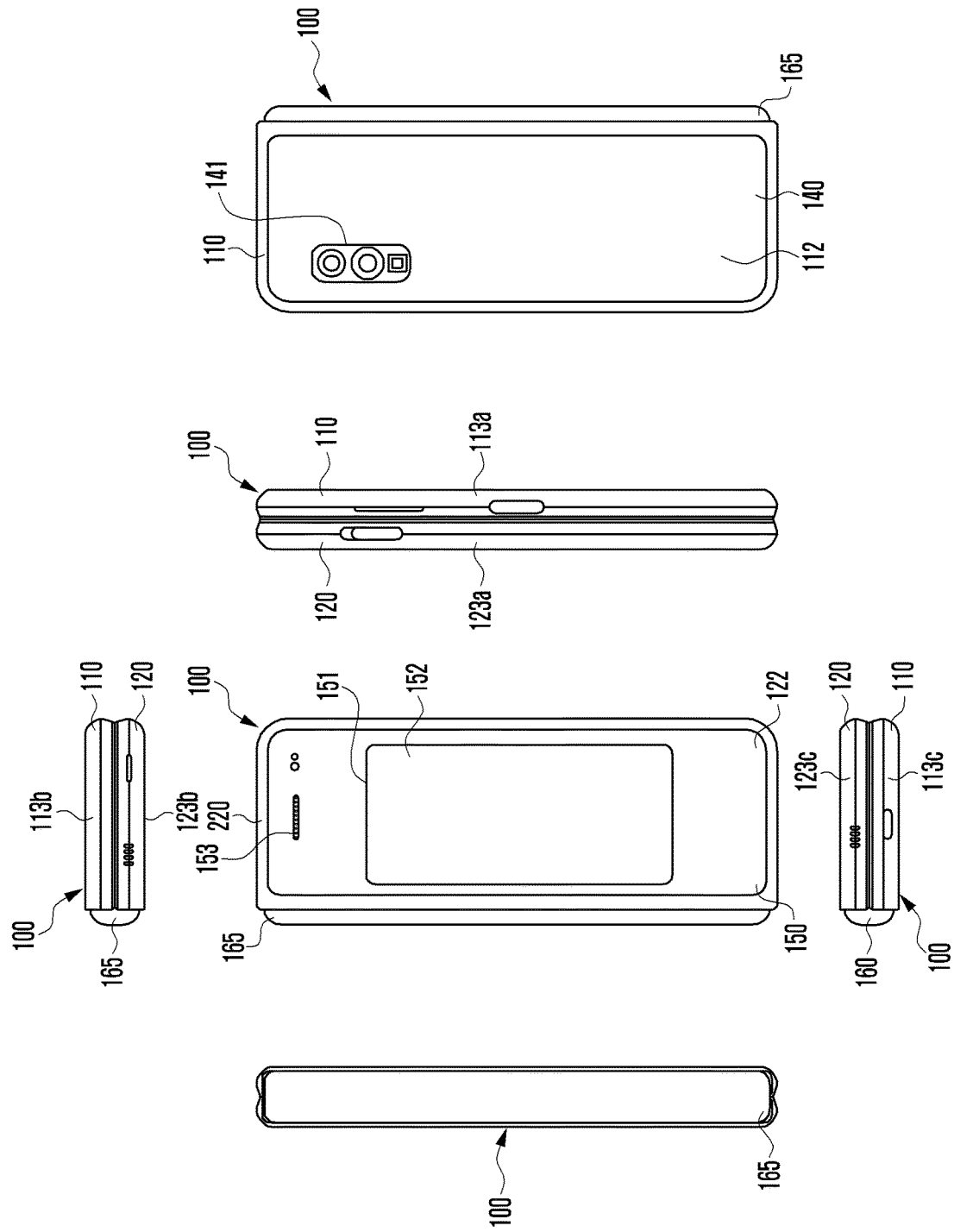
FIG. 2 is a diagram illustrating a folded state of the electronic device of FIG. 1 according to various embodiments of the disclosure.

FIG. 2 is a diagram illustrating a folded state of the electronic device of FIG. 1 according to various embodiments of the disclosure.

Referring to FIG. 1, an electronic device 100 may include a pair of housing structures 110 and 120 rotatably coupled via a hinge structure (e.g., hinge structure 164 in FIG. 3) to be folded relative to each other, a hinge cover 165 covering the foldable portion of the pair of housing structures 110 and 120, and a display 130 (e.g., flexible display or foldable display) disposed in the space formed by the pair of housing structures 110 and 120. In the description, the surface on which the display 130 is disposed may be referred to as the front surface of the electronic device 100, and the opposite side of the front surface may be referred to as the rear surface of the electronic device 100. The surface surrounding the space between the front surface and the rear surface may be referred to as the side surface of the electronic device 100.

In one embodiment, the pair of housing structures 110 and 120 may include a first housing structure 110 including a sensor region 131d, a second housing structure 120, a first rear cover 140, and a second rear cover 150. The pair of housing structures 110 and 120 of the electronic device 100 are not limited to the shape or combination illustrated in FIGS. 1 and 2, but may be implemented in various shapes or combinations. For example, in another embodiment, the first housing structure 110 and the first rear cover 140 may be formed as a single body, and the second housing structure 120 and the second rear cover 150 may be formed as a single body.

In one embodiment, the first housing structure 110 and the second housing structure 120 may be disposed at both sides with respect to the folding axis (A) and may be substantially symmetrical with respect to the folding axis (A). In one embodiment, the angle or distance between the first housing structure 110 and the second housing structure 120 may vary depending upon whether the electronic device 100 is in the flat state or closed state, the folded state, or the intermediate state. In one embodiment, the first housing structure 110 includes the sensor region 131d where various sensors are disposed, but may have a symmetrical shape with the second housing structure 120 in other regions. In another embodiment, the sensor region 131d may be disposed in a specific region of the second housing structure 120 or may be replaced.

In one embodiment, during the flat state of the electronic device 100, the first housing structure 110 may be connected to the hinge structure (e.g., hinge structure 164 in FIG. 3), and may include a first surface 111 facing the front surface of the electronic device 100, a second surface 112 facing away from the first surface 111, and a first side member 113 enclosing at least a portion of the space between the first surface 111 and the second surface 112. In one embodiment, the first side member 113 may include a first side surface 113a disposed in parallel with the folding axis (A), a second side surface 113b extending from one end of the first side surface 113a in a direction perpendicular to the folding axis, and a third side surface 113c extending from the other end of the first side surface 113a in a direction perpendicular to the folding axis.

In one embodiment, during the flat state of the electronic device 100, the second housing structure 120 may be connected to the hinge structure (e.g., hinge structure 164 in FIG. 3), and may include a third surface 121 facing the front surface of the electronic device 100, a fourth surface 122 facing away from the third surface 121, and a second side member 123 enclosing at least a portion of the space between the third surface 121 and the fourth surface 122. In one embodiment, the second side member 123 may include a fourth side surface 123a disposed in parallel with the folding axis (A), a fifth side surface 123b extending from one end of the fourth side surface 123a in a direction perpendicular to the folding axis, and a sixth side surface 123c extending from the other end of the fourth side surface 123a in a direction perpendicular to the folding axis. In one embodiment, the third surface 121 may face the first surface 111 in the folded state.

In one embodiment, the electronic device 100 may include a recess 101 formed to accommodate the display 130 through a structural combination of the shapes of the first housing structure 110 and the second housing structure 120. The recess 101 may have substantially the same size as the display 130. In one embodiment, the recess 101 may have two or more different widths in a direction perpendicular to the folding axis (A) due to the sensor region 131d. For example, the recess 101 may have a first width (W1) between a first portion 120a of the second housing structure 120 parallel to the folding axis (A) and a first portion 110a of the first housing structure 110 formed at the edge of the sensor region 131d, and have a second width (W2) between a second portion 120b of the second housing structure 120 and a second portion 110b of the first housing structure 110 that does not correspond to the sensor region 113d and is parallel to the folding axis (A). Here, the second width (W2) may be wider than the first width (W1). In other words, the recess 101 may be formed to have the first width (W1) ranging from the first portion 110a of the first housing structure 110 to the first portion 120a of the second housing structure 120 (asymmetric shape), and the second width (W2) ranging from the second portion 110b of the first housing structure 110 to the second portion 120b of the second housing structure 120 (symmetric shape). In one embodiment, the first portion 110a and the second portion 110b of the first housing structure 110 may be located at different distances from the folding axis (A). The width of the recess 101 is not limited to the example shown above. In various embodiments, the recess 101 may have two or more different widths owing to the shape of the sensor region 113d or the asymmetry of the first housing structure 110 or the second housing structure 120.

In one embodiment, at least a portion of the first housing structure 110 and the second housing structure 120 may be made of a metal or non-metal material having a rigidity value selected to support the display 130.

In one embodiment, the sensor region 131d may be formed to have a preset area near to one corner of the first housing structure 110. However, the arrangement, shape, or size of the sensor region 131d is not limited to the illustrated example. For example, in a certain embodiment, the sensor region 131d may be formed at another corner of the first housing structure 110 or in any region between the upper corner and the lower corner. In another embodiment, the sensor region 131d may be disposed at a portion of the second housing structure 120. In another embodiment, the sensor region 131d may be formed to extend between the first housing structure 110 and the second housing structure 120. In one embodiment, to perform various functions, the electronic device 100 may include components exposed to the front surface of the electronic device 100 through the sensor region 113d or through one or more openings provided in the sensor region 131d. The components may include, for example, at least one of a front camera, a receiver, a proximity sensor, an illuminance sensor, an iris recognition sensor, an ultrasonic sensor, or an indicator.

In one embodiment, the first rear cover 140 may be disposed on the second surface 112 of the first housing structure 110 and may have a substantially rectangular periphery. In one embodiment, at least a portion of the periphery may be wrapped by the first housing structure 110. Similarly, the second rear cover 150 may be disposed on the fourth surface 122 of the second housing structure 120, and at least a portion of the periphery thereof may be wrapped by the second housing structure 120.

In the illustrated embodiment, the first rear cover 140 and the second rear cover 150 may have a substantially symmetrical shape with respect to the folding axis (A). In another embodiment, the first rear cover 140 and the second rear cover 150 may have various different shapes. In another embodiment, the first rear cover 140 may be formed as a single body with the first housing structure 110, and the second rear cover 150 may be formed as a single body with the second housing structure 120.

In one embodiment, the first rear cover 140, the second rear cover 150, the first housing structure 110, and the second housing structure 120 may be combined with each other so as to provide a space where various components (e.g., printed circuit board, antenna module, sensor module, and battery) of the electronic device 100 can be arranged. In one embodiment, one or more components may be disposed on or visually exposed via the rear surface of the electronic device 100. For example, one or more components or sensors may be visually exposed through the first rear region 141 of the first rear cover 140. The sensors may include a proximity sensor, a rear camera, and/or a flash. In another embodiment, at least a portion of the sub-display 152 may be visually exposed through the second rear region 151 of the second rear cover 150.

The display 130 may be disposed on the space formed by the pair of housing structures 110 and 120. For example, the display 130 may be seated in the recess (e.g., recess 101 in FIG. 1) formed by the pair of housing structures 110 and 120, and may be disposed to substantially occupy most of the front surface of the electronic device 100. Hence, the front surface of the electronic device 100 may include the display 130, a portion (e.g., edge region) of the first housing structure 110 close to the display 130, and a portion (e.g. edge region) of the second housing structure 120 close to the display 130. In one embodiment, the rear surface of the electronic device 100 may include the first rear cover 140, a portion (e.g., edge region) of the first housing structure 110 close to the first rear cover 140, the second rear cover 150, and a portion (e.g. edge region) of the second housing structure 120 close to the second rear cover 150.

In one embodiment, the display 130 may refer to a display whose at least a portion may be deformed into a flat or curved surface. In one embodiment, the display 130 may include a folding region 131c, a first region 131a disposed on one side (e.g., right side of the folding region 131c) with respect to the folding region 131c, and a second region 131b disposed on the other side (e.g., left side of the folding region 131c). For example, the first region 131a may be disposed on the first surface 111 of the first housing structure 110, and the second region 131b may be disposed on the third surface 121 of the second housing structure 120. This demarcation of the display 130 is only an example, and the display 130 may be subdivided into plural regions (e.g., four or more regions) according to the structure or functionality. For example, in the embodiment of FIG. 1, the area of the display 130 may be subdivided with respect to the folding region 131c or the folding axis (A) extending parallel to the y-axis. However, in another embodiment, the area of the display 130 may be subdivided with respect to a different folding region (e.g., folding region parallel to the x-axis) or a different folding axis (e.g., folding axis parallel to the x-axis). The aforementioned subdivision of the display is only a physical demarcation based on the pair of housing structures 110 and 120 and the hinge structure (e.g., hinge structure 164 in FIG. 3), and the display 130 may substantially present one full screen through the pair of housing structures 110 and 120 and the hinge structure (e.g., hinge structure 164 in FIG. 3). In one embodiment, the first region 131a and the second region 131b may have a symmetrical shape with respect to the folding region 131c. Although the first region 131a may include a notch region (e.g., notch region 133 in FIG. 3) cut according to the presence of the sensor region 131d, it may have a symmetrical shape with the second region 131b in other portions. In other words, the first region 131a and the second region 131b may include portions with symmetrical shapes and portions with asymmetrical shapes.

Figure 3:
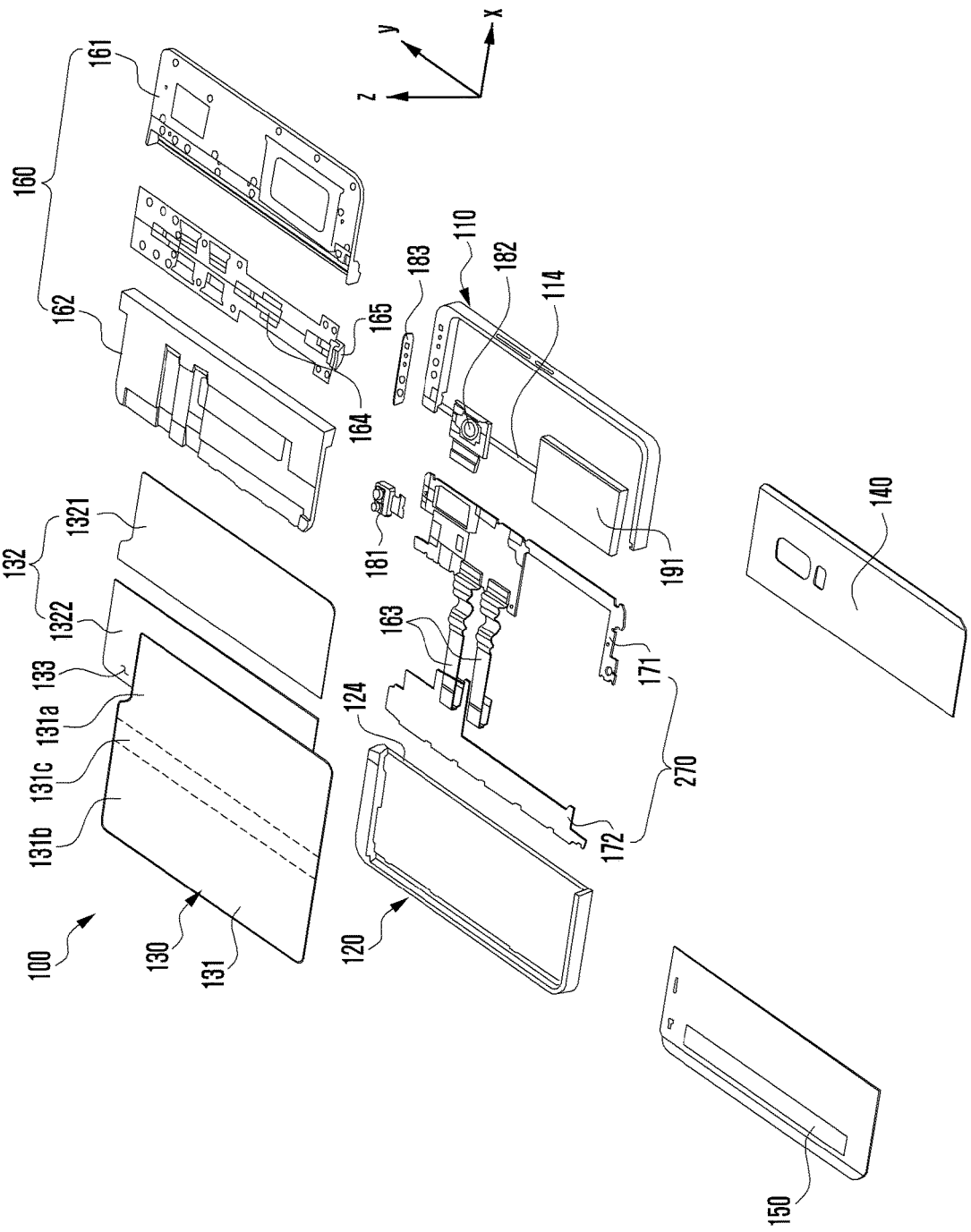
FIG. 3 is an exploded perspective view illustrating an electronic device according to according to various embodiments of the disclosure.

Referring to FIG. 2, the hinge cover 165 may be disposed between the first housing structure 110 and the second housing structure 120 so as to cover the internal components (e.g., hinge structure 164 in FIG. 3). In one embodiment, the hinge cover 165 may be covered by portions of the first housing structure 110 and the second housing structure 120 or be exposed to the outside according to the operating state (e.g., flat state or folded state) of the electronic device 100.

For example, when the electronic device 100 is in the flat state as illustrated in FIG. 1, the hinge cover 165 may be covered by the first housing structure 110 and the second housing structure 120 so as not to be exposed. When the electronic device 100 is in the folded state (e.g., completely folded state) as illustrated in FIG. 2, the hinge cover 165 may be exposed to the outside between the first housing structure 110 and the second housing structure 120. When the electronic device 100 is in the intermediate state where the first housing structure 110 and the second housing structure 120 make a certain angle, the hinge cover 165 may be partially exposed to the outside between the first housing structure 110 and the second housing structure 120. In this case, the exposed portion may be less than that for the fully folded state. In one embodiment, the hinge cover 165 may include a curved surface.

Next, a description is given of configurations of the first housing structure 110 and the second housing structure 120 and regions of the display 130 according to the operating state (e.g. flat state or folded state) of the electronic device 100.

In one embodiment, when the electronic device 100 is in the flat state (e.g., state of FIG. 1), the first housing structure 110 and the second housing structure 120 may make an angle of 180 degrees, and the first region 131a and the second region 131b of the display may be disposed to face in the same direction. In addition, the folding region 131c may be coplanar with the first region 131a and the second region 131b.

In one embodiment, when the electronic device 100 is in the folded state (e.g., state of FIG. 2), the first housing structure 110 and the second housing structure 120 may be disposed to face each other. The first region 131a and the second region 131b of the display 130 may face each other, making a narrow angle (e.g., between 0 degrees and 10 degrees). At least a portion of the folding region 131c may form a curved surface with a preset curvature.

In one embodiment, when the electronic device 100 is in the intermediate state, the first housing structure 110 and the second housing structure 120 may be disposed to make a certain angle. The first region 131a and the second region 131b of the display 130 may form an angle greater than that for the folded state and less than that for the flat state. At least a portion of the folding region 131c may form a curved surface with a preset curvature. This curvature may be less than that for the folded state.

FIG. 3 is an exploded perspective view of an electronic device according to an embodiment of the disclosure.

Referring to FIG. 3, in one embodiment, the electronic device 100 may include a display 130, a support member assembly 160, at least one printed circuit board 170, a first housing structure 110, a second housing structure 120, a first rear cover 140, and a second rear cover 150. In the description, the display 130 may be referred to as a display unit, display module, or display assembly.

The display 130 may include a display panel 131 (e.g., flexible display panel), and at least one plate 132 or layer on which the display panel 131 is seated. In one embodiment, the plate 132 may be disposed between the display panel 131 and the support member assembly 160. The display panel 131 may be disposed in at least a portion of one surface of the plate 132. The plate 132 may include a first plate 1321 and a second plate 1322 divided based on the hinge structure 164. The plate 132 may include at least one member that cannot be folded together when the first housing structure 110 and the second housing structure 120 rotate in a folded and/or unfolded state based on the hinge structure 164. The plate 132 may include at least one subsidiary material layer (e.g., graphite member) and/or a conductive plate (e.g., SUS sheet or Cu sheet) disposed at a rear surface of the display panel 131. In one embodiment, the plate 132 may be formed in a shape corresponding to the display panel 131. For example, a partial area of the first plate 1321 may be formed in a shape corresponding to the notch area 133 of the display panel 131. In another embodiment, the conductive plate may be integrally formed through a bendable connecting area.

The support member assembly 160 may include a first support member 161, a second support member 162, a hinge structure 164 disposed between the first support member 161 and the second support member 162, a hinge cover 165 to cover the hinge structure 164 when viewed from the outside, and a wiring member 163 (e.g., flexible printed circuit board (FPCB)) that crosses the first support member 161 and the second support member 162.

In one embodiment, the support member assembly 160 may be disposed between the plate 132 and at least one printed circuit board 170. For example, the first support member 161 may be disposed between the first region 131a of the display 130 and the first printed circuit board 171. The second support member 162 may be disposed between the second region 131b of the display 130 and the second printed circuit board 172.

In one embodiment, at least a portion of the wiring member 163 and the hinge structure 164 may be disposed within the support member assembly 160. The wiring member 163 may be disposed in a direction crossing the first support member 161 and the second support member 162 (e.g., x-axis direction). The wiring member 163 may be disposed in a direction (e.g., x-axis direction) perpendicular to the folding axis (e.g., y-axis or folding axis (A) in FIG. 2) of the folding region 131c.

The at least one printed circuit board 170 may include, as described above, the first printed circuit board 171 disposed on the side of the first support member 161, and the second printed circuit board 172 disposed on the side of the second support member 162. The first printed circuit board 171 and the second printed circuit board 172 may be disposed inside the space formed by the support member assembly 160, the first housing structure 110, the second housing structure 120, the first rear cover 140, and the second rear cover 150. Various components for implementing functions of the electronic device 100 may be mounted on the first printed circuit board 171 and the second printed circuit board 172.

In an embodiment, the first housing structure 110 may include a first printed circuit board 171, a battery 191, at least one sensor module 181, or at least one camera module 182 disposed in a space formed through the first support member 161. The first housing structure 110 may include a window glass 183 disposed to protect at least one sensor module 181 and at least one camera module 182 at a position corresponding to the notch area 133 of the display 130. In an embodiment, the second housing structure 120 may include a second printed circuit board 172 disposed in a space formed through the second support member 162. According to one embodiment, the first housing structure 110 and the first support member 161 may be integrally formed. According to one embodiment, the second housing structure 120 and the second support member 162 may also be integrally formed.

In one embodiment, the first housing structure 110 may include a first rotary support surface 114, and the second housing structure 120 may include a second rotary support surface 124 corresponding to the first rotary support surface 114. The first rotary support surface 114 and the second rotary support surface 124 may include a curved surface corresponding to the curved surface included in the hinge cover 165.

In one embodiment, when the electronic device 100 is in the flat state (e.g., state of FIG. 1), the first rotary support surface 114 and the second rotary support surface 124 may cover the hinge cover 165 so that the hinge cover 165 may be not or minimally exposed to the rear surface of the electronic device 100. When the electronic device 100 is in the folded state (e.g., state of FIG. 2), the first rotary support surface 114 and the second rotary support surface 124 may rotate along the curved surface included in the hinge cover 165 so that the hinge cover 165 may be maximally exposed to the rear surface of the electronic device 100.

Figure 4A:
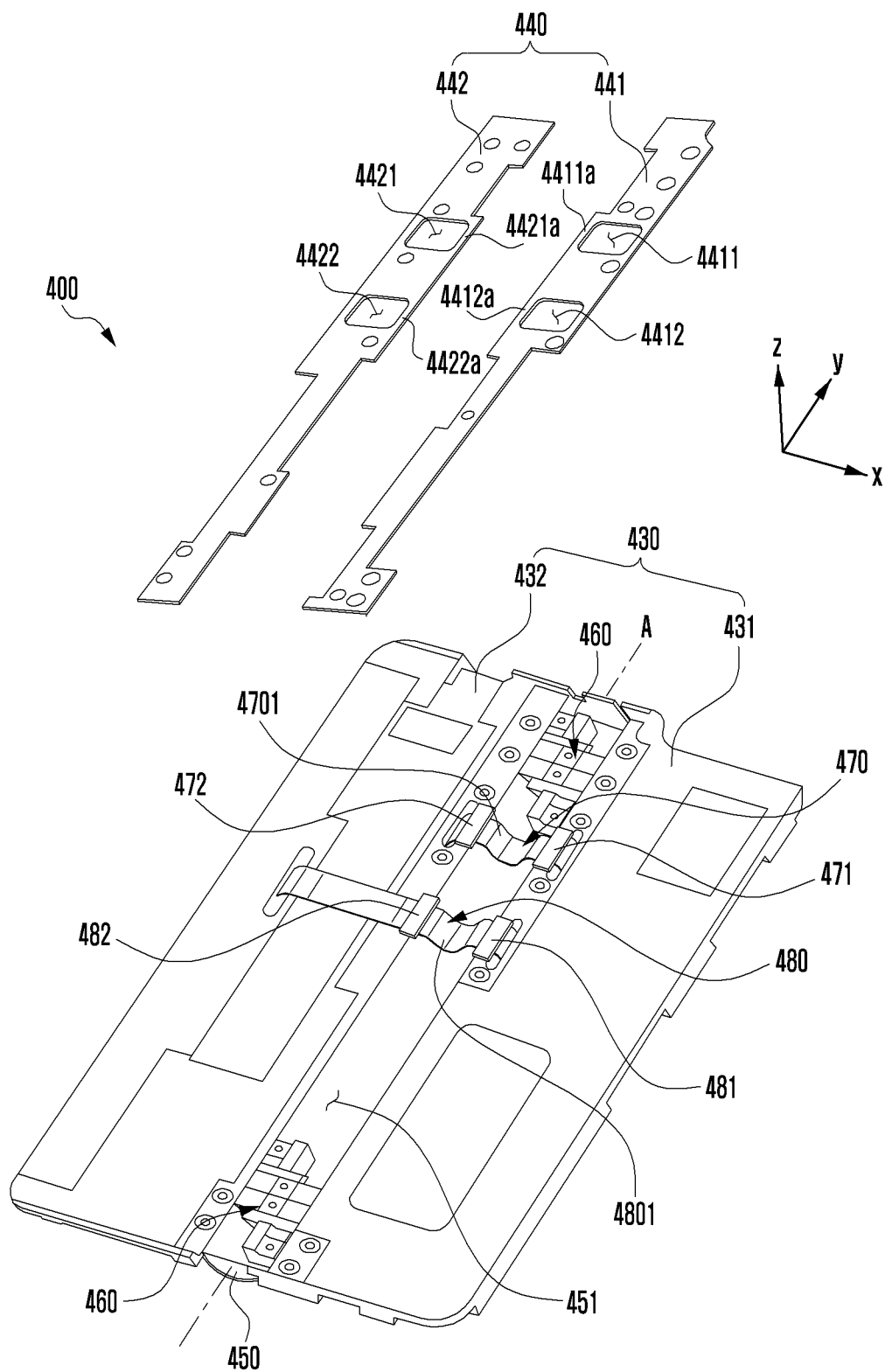
FIG. 4A is an exploded perspective view illustrating a state in which a wiring member is disposed through a hinge cover, a hinge plate assembly, and a support member assembly according to various embodiments of the disclosure.

FIG. 4A is an exploded perspective view illustrating a state in which wiring members 470 and 480 are disposed through a hinge cover 450, a hinge plate assembly 440, and a support member assembly 430 according to various embodiments of the disclosure.

Figure 4B:
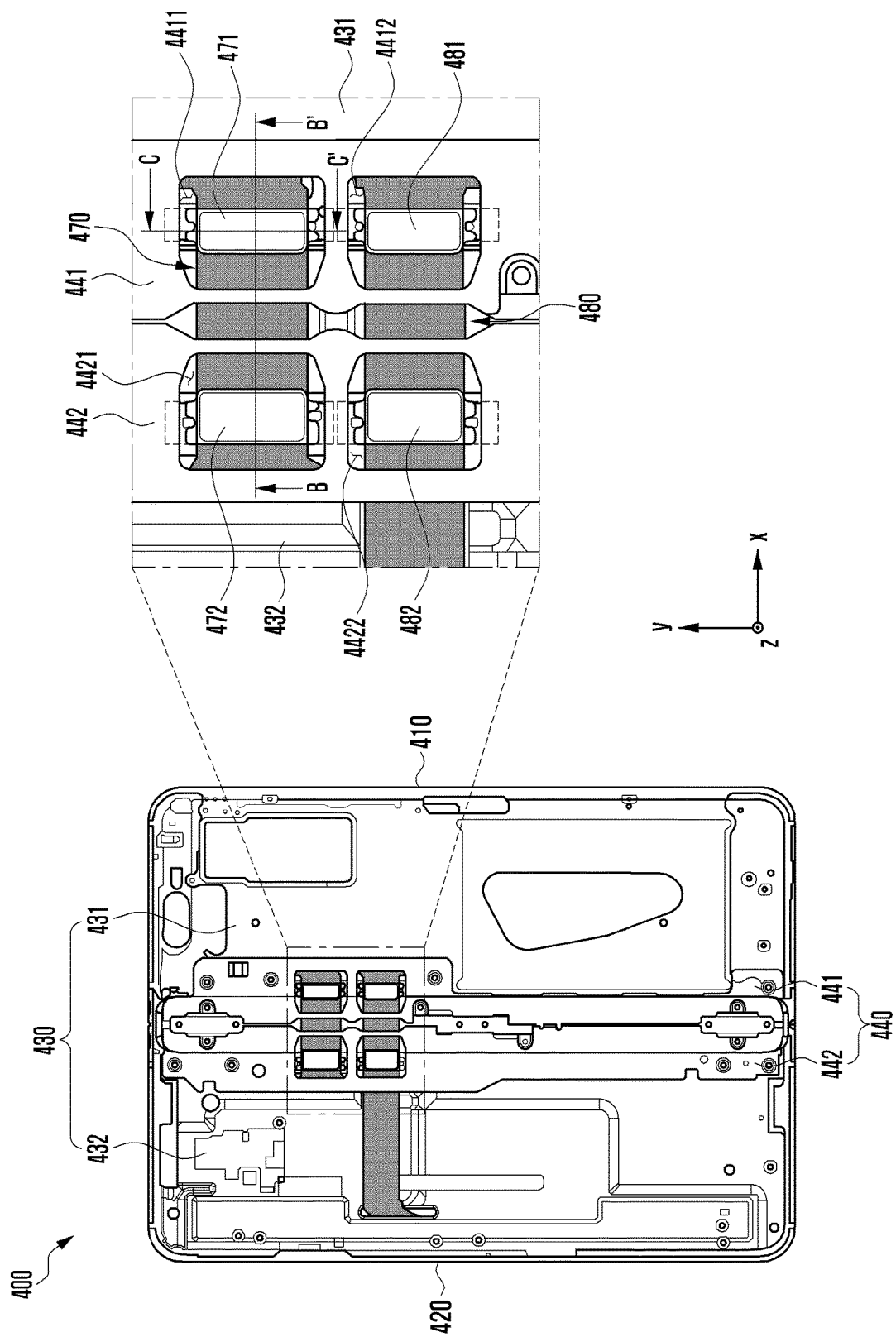
FIG. 4B is a diagram illustrating a state in which a wiring member is fixed through a hinge cover, a hinge plate assembly, and a support member assembly according to various embodiments of the disclosure.

FIG. 4B is a diagram illustrating a state in which wiring members 470 and 480 are fixed through the hinge cover 450, the hinge plate assembly 440, and the support member assembly 430 according to various embodiments of the disclosure.

An electronic device 400 of FIGS. 4A and 4B may be at least partially similar to the electronic device 100 of FIG. 3, or may further include other components of the electronic device.

Referring to FIGS. 4A and 4B, the electronic device 400 (e.g., the electronic device 100 of FIG. 3) may include a hinge cover 450 (e.g., the hinge cover 265 of FIG. 3) including at least one hinge module 460 disposed in an internal space 451, a hinge plate assembly 440 rotatably fixed to the at least one hinge module 460, and/or a support member assembly 430 (e.g., the support member assembly 260 of FIG. 3) fixed to the hinge plate assembly 440. According to one embodiment, the hinge plate assembly 440 may include a first hinge plate 441 fixed to one side of the hinge module 460 and a second hinge plate 442 fixed to the other side of the hinge module 460. According to one embodiment, the first hinge plate 441 may include a first opening 4411 and a second opening 4412 that are at least partially formed. According to one embodiment, the second hinge plate 442 may include a third opening 4421 and a fourth opening 4422 that are at least partially formed. According to an embodiment, the first hinge plate 441 and the second hinge plate 442 fixed through the hinge module 460 may be disposed to face each other during a folding operation. According to one embodiment, when the first hinge plate 441 and the second hinge plate 442 are folded with respect to each other, the first opening 4411 may face the third opening 4421, and the second opening 4412 may face the fourth opening 4422. According to one embodiment, in a state in which the first hinge plate 441 and the second hinge plate 442 are fixed to the hinge module 460 and in which the first hinge plate 441 and the second hinge plate 442 are unfolded, the internal space 451 of the hinge cover 450 may be closed. In this state, the internal space 451 of the hinge cover 450 may be visible from the outside through the first opening 4411, the second opening 4412, the third opening 4421, or the fourth opening 4422.

According to various embodiments, the support member assembly 430 may include a first support member 431 (e.g., the first support member 161 of FIG. 3) and a second support member 432 (e.g., the second support member 162 of FIG. 3). According to one embodiment, the first support member 431 may be fixed to the first hinge plate 441. According to one embodiment, the second support member 432 may be fixed to the second hinge plate 442. According to one embodiment, the first support member 431 may support a portion of the display (e.g., the display 130 of FIG. 3) in the first housing (e.g., the second housing structure 110 of FIG. 3) together with the first hinge plate 441. According to an embodiment, the first support member 431 and the first hinge plate 441 may be coupled to have the same plane so as to support the display. According to one embodiment, the second support member 432 may support a portion of the display (e.g., the display 130 of FIG. 3) in the second housing (e.g., the second housing structure 120 of FIG. 3) together with the second hinge plate 442. According to an embodiment, the second support member 432 and the second hinge plate 442 may be coupled to have the same plane so as to support the display. Accordingly, in an unfolded state, the first support member 431, the second support member 432, the first hinge plate 441, and the second hinge plate 442 may have the same plane, and support a rear surface of the display (e.g., the display 130 of FIG. 3). In another embodiment, the first support member 431 may be replaced with at least a portion of the first housing (e.g., the first housing structure 110 of FIG. 3). In another embodiment, the second support member 432 may be replaced with at least a portion of the second housing (e.g., the second housing structure 120 of FIG. 3).

According to various embodiments, the electronic device 400 may include at least one wiring member 470 and 480 extended through the first support member 431, the internal space 451 of the hinge cover 450, and the second support member 432. According to an embodiment, the wiring members 470 and 480 may include a first wiring member 470 and/or a second wiring member 480 spaced apart from the first wiring member 470 by a predetermined interval. Because a disposition configuration of the second wiring member 480 is substantially the same as that of the first wiring member 470, a detailed description thereof may be omitted. According to an embodiment, the at least one wiring member 470 and 480 may include a flexible printed circuit board (FPCB) in which an electrical wiring is disposed therein.

According to various embodiments, the first wiring member 470 may include a bendable portion 4701 and at least one fixing portion 471 and 472 disposed in at least a portion of the bendable portion 4701. According to an embodiment, at least a portion of the bendable portion 4701 may be formed in a rigid body type. According to one embodiment, one end of the first wiring member 470 may be electrically connected to an electrical structure (e.g., the first printed circuit board 171 of FIG. 3) that penetrates a portion of the first support member 431 through the bendable portion 4701 to be disposed in an internal space of the first housing (e.g., the first housing structure 110 of FIG. 3). According to one embodiment, the other end of the first wiring member 470 may be electrically connected to an electrical structure (e.g., the second printed circuit board 172 of FIG. 3) that penetrates a portion of the second support member 432 through the bendable portion 4701 to be disposed in the internal space of the second housing (e.g., the second housing structure 120 of FIG. 3). According to an embodiment, the bendable portion 4701 disposed in the internal space 451 of the hinge cover 450 of the first wiring member 470 may include a spare portion for receiving an amount of rotation according to a folding operation of the first support member 431 and the second support member 432. According to one embodiment, in order to maintain such a spare portion in the internal space 451 of the hinge cover 450, a pair of spaced rigid body type fixing portions 471 and 472 may be disposed in at least a portion of the bendable portion 4701 and be fixed to the first support member 431 and the second support member 432. According to an embodiment, the pair of fixing portions 471 and 472 may include a first fixing portion 471 fixed to the first support member 431 and a second fixing portion 472 fixed to the second support member 432. According to one embodiment, the first fixing portion 471 may be fixed to the first support member 431 and be at least partially exposed through the first opening 4411 of the first hinge plate 441 fixed to the first support member 431. Accordingly, the bendable portion 4701 of the first wiring member 470 may be disposed to pass at least partially between the first hinge plate 441 and the first support member 431.

According to various embodiments, because the first fixing portion 471 is received in the first opening 4411 to be at least partially exposed, the first fixing portion 471 may reduce a stacking height by a thickness of the first fixing portion 471 to the maximum, compared to a structure in which the first hinge plate 441 and the first fixing portion 471 are sequentially stacked without a separate opening. According to an embodiment, the first fixing portion 471 may be received in the first opening 4411 and be disposed not to protrude from a surface of the first hinge plate 441 in a display direction. According to one embodiment, because the second fixing portion 472 of the first wiring member 470 is also disposed through the third opening 4421 of the second hinge plate 442, substantially the same effect can be obtained. According to an embodiment, the second wiring member 480 may also include a pair of fixing portions 481 and 482 in a bendable portion 4801 and may be disposed in substantially the same manner through the second opening 4412 of the first hinge plate 441 and the fourth opening 4422 of the second hinge plate 442.

Figure 5:
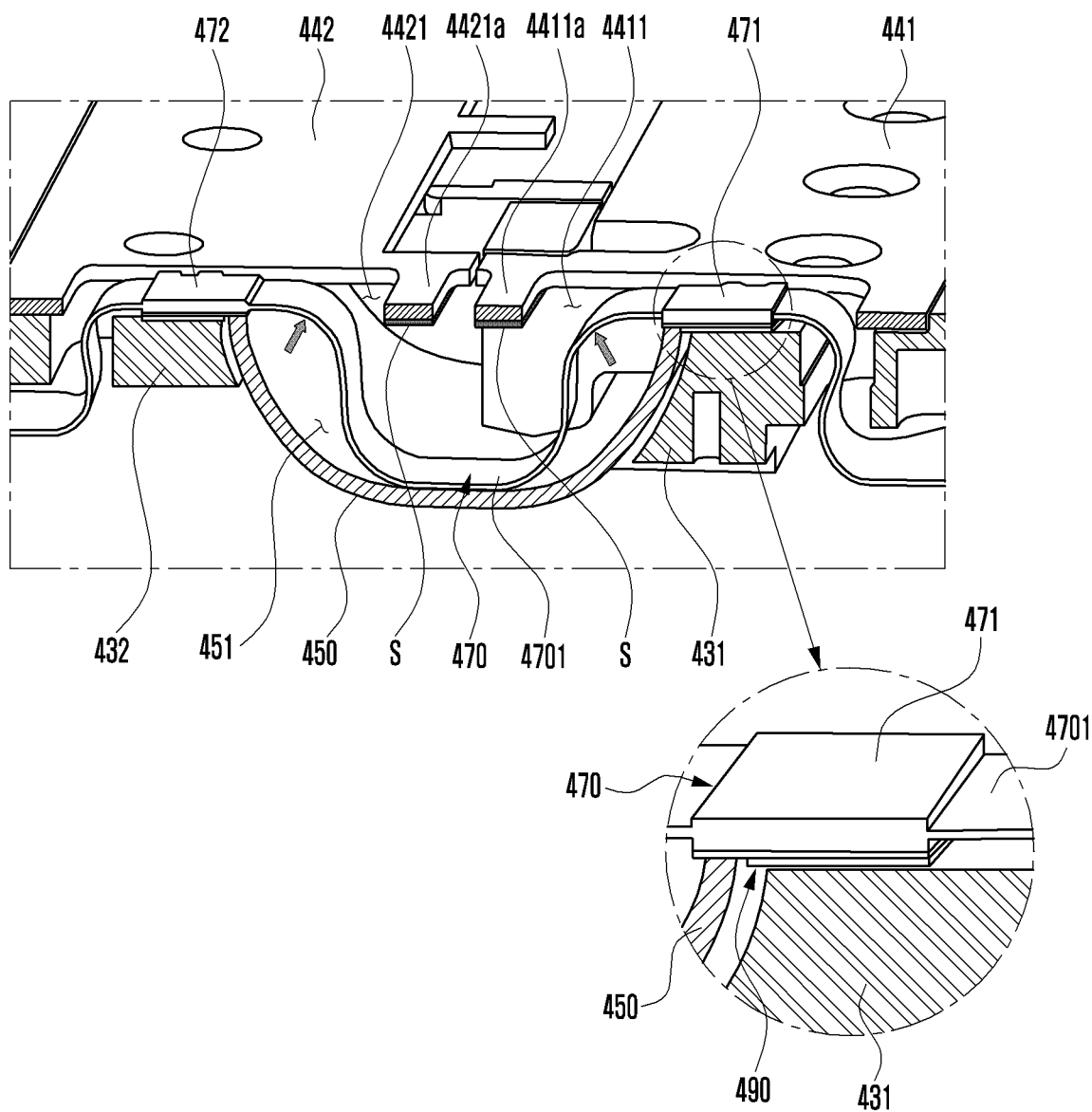
FIG. 5 is a partially coupled view illustrating a stacked structure of wiring members taken along line B-B' of FIG. 4B according to various embodiments of the disclosure.

FIG. 5 is a partially coupled view illustrating a stacked structure of the wiring member 470 taken along line B-B' of FIG. 4B according to various embodiments of the disclosure.

Referring to FIG. 5, the first fixing portion 471 and the second fixing portion 472 of the first wiring member 470 may be fixed through an adhering member at corresponding positions of the first support member 431 and the second support member 432. However, a repulsive force (e.g., a force applied in a direction of the arrow of FIG. 5) of the bendable portion 4701 of the first wiring member 470 disposed in the internal space 451 of the hinge cover 450 may be generated through frequent closing and/or unfolding operations of the first support member 431 and the second support member 432, whereby the first fixing portion 471 and/or the second fixing portion 472 may release an adhesive force from each of the support members 431 and 432 and be protruded through the first opening 4411 and/or the third opening 4421, and the protruded fixing portion (the first fixing portion 471 and/or the second fixing portion 472) may unintentionally press the display (e.g., the display 130 of FIG. 3) disposed thereon to cause a lifting phenomenon in the corresponding portion.

According to various embodiments, in order to prevent such a phenomenon, the electronic device 400 may include a reinforcing member 490 for preventing a phenomenon in which the first fixing portion 471 and/or the second fixing portion 472 are arbitrarily protruded from the first opening 4411 and/or the third opening 4421 by a repulsive force of the bendable portion 4701. According to one embodiment, the reinforcing member 490 may have a disposition structure for regulating the first fixing portion 471 and/or the second fixing portion 472 between the first hinge plate 441 and the first support member 431 and/or between the second hinge plate 442 and the second support member 432. According to one embodiment, the reinforcing member 490 may have a structure fixed to the first fixing portion 471 and/or the second fixing portion 472, and for regulating so that the first fixing portion 471 and/or the second fixing portion 472 do not protrude to the first opening 4411 and/or the third opening 4421 of the first hinge plate 441.

According to various embodiments, in a first edge 4411a positioned in a direction of the second hinge plate 442 among edges of the first opening 4411 and a third edge 4421a positioned in a first hinge plate direction among edges of the third opening 4421, a buffer member S may be disposed in a direction of the internal space 451 of the hinge cover 450. According to one embodiment, when the first hinge plate 441 and the second hinge plate 442 are folded to face each other, the buffer member S may prevent abrasion and/or damage of the first wiring member 470 in contact with the first edge 4411a and the third edge 4421a. Although not illustrated, the buffer member S may be also applied in the same structure to a second edge (e.g., a second edge 4412a of FIG. 4A) around the second opening (e.g., the second opening 4412 of FIG. 4A) and a fourth edge (e.g., a fourth edge 4422a of FIG. 4A) of the fourth opening (e.g., a fourth opening 4422 of FIG. 4A).

Figure 6:
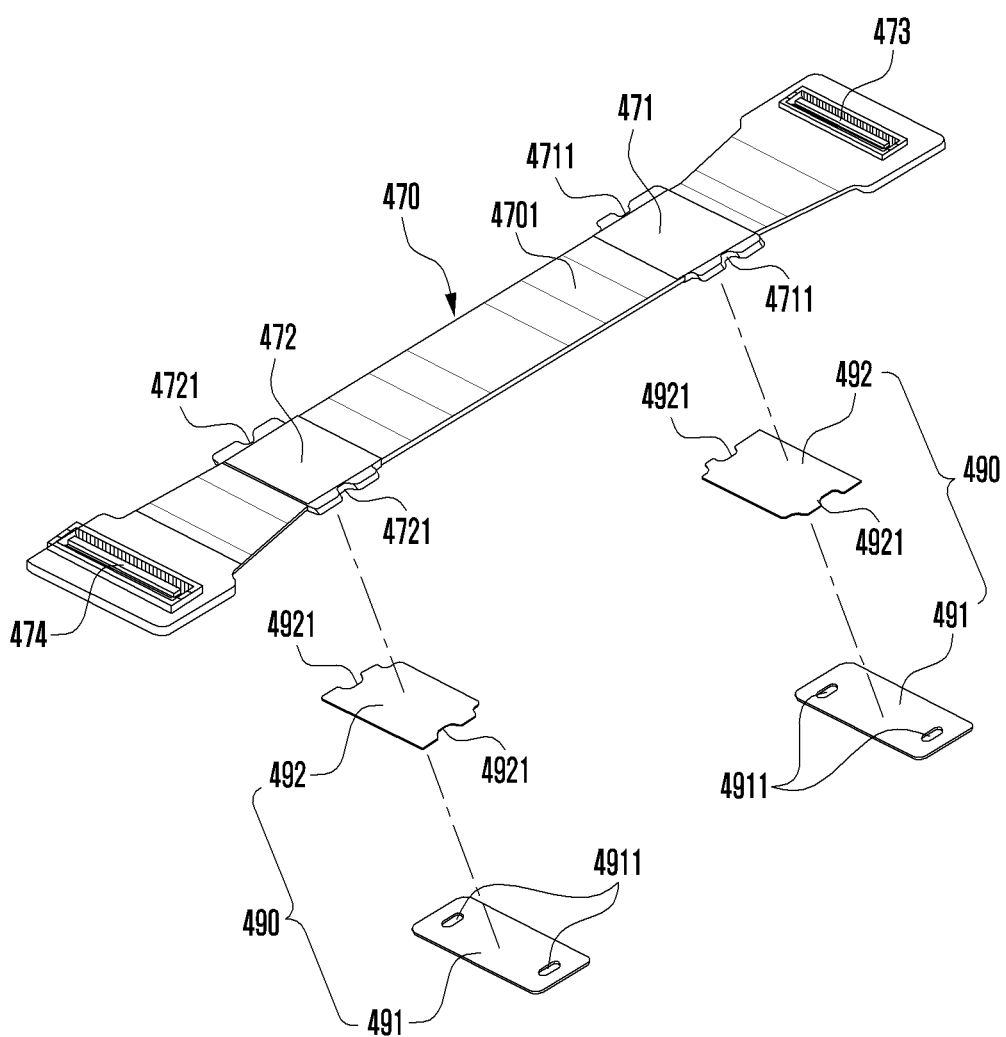
FIG. 6 is an exploded perspective view illustrating a reinforcing member disposed in a wiring member according to various embodiments of the disclosure.

FIG. 6 is an exploded perspective view illustrating the reinforcing member 490 disposed in the wiring member 470 according to various embodiments of the disclosure.

Referring to FIG. 6, the wiring member 470 may include a bendable portion 4701 having a predetermined length and a pair of connector members 473 and 474 disposed at both ends of the bendable portion 4701. Any one connector member 473 of the pair of connector members 473 and 474 may be electrically connected to a first electrical structure (e.g., the first printed circuit board 171 of FIG. 3) in an internal space of a first housing 410 (e.g., the first housing structure 110 of FIG. 3). According to one embodiment, the other connector member 474 may be electrically connected to a second electrical structure (e.g., the printed circuit board 172 of FIG. 3) in an internal space of a second housing 420 (e.g., the second housing structure 120 of FIG. 3).

According to various embodiments, as described above, the wiring member 470 may include a bendable portion 4701 received at least partially in the internal space (e.g., the internal space 451 of FIG. 4A) of the hinge cover (e.g., the hinge cover 450 of FIG. 4A) and whose some is movably disposed through a support member assembly (e.g., the support member assembly 430 of FIG. 4A). According to an embodiment, the wiring member 470 may include a pair of fixing portions 471 and 472 disposed in the bendable portion 4701 and to be supported through the support member assembly 430. According to an embodiment, the fixing portions 471 and 472 may include a rigid body disposed in a manner that encloses the bendable portion 4701. According to an embodiment, the fixing portions 471 and 472 may include a polymer material (e.g., PC) disposed to enclose the bendable portion 4701. In another embodiment, the fixing portions 471 and 472 may be disposed to enclose at least a portion of the bendable portion 4701.

Hereinafter, the reinforcing member 490 disposed in the first fixing portion 471 will be described, but substantially the same reinforcing member may also be disposed in the second fixing portion 472.

According to various embodiments, the reinforcing member 490 may include a locking plate 491 stacked on the first fixing portion 471. According to one embodiment, the reinforcing member 490 may include a support plate 492 disposed between the first fixing portion 471 and the locking plate 491. According to one embodiment, the reinforcing member 490 may be disposed between the first fixing portion 471 and the first support member (e.g., the first support member 431 of FIG. 5), as illustrated in FIG. 5. According to one embodiment, the locking plate 491 and the support plate 492 may be attached to each other through thermocompression bonding. According to one embodiment, the locking plate 491 and the support plate 492 may be made of a polymer material and/or a metal material.

According to various embodiments, the locking plate 491 of the reinforcing member 490 may include a guide hole 4911 formed at a position corresponding to at least one groove 4711 and 4721 formed in the first fixing portion 471 and the second fixing portion 472. According to one embodiment, the support plate 492 of the reinforcing member 490 may also include a guide groove 4921 formed at a position corresponding to at least one groove 4711 and 4721 formed in the first fixing portion 471 and the second fixing portion 472. Accordingly, when the reinforcing member 490 is fixed to the first fixing portion 471 and the second fixing portion 472, a fixed position thereof may be aligned through the guide hole 4911 of the locking plate 491 and the guide groove 4921 of the support plate 492.

Figure 7A:
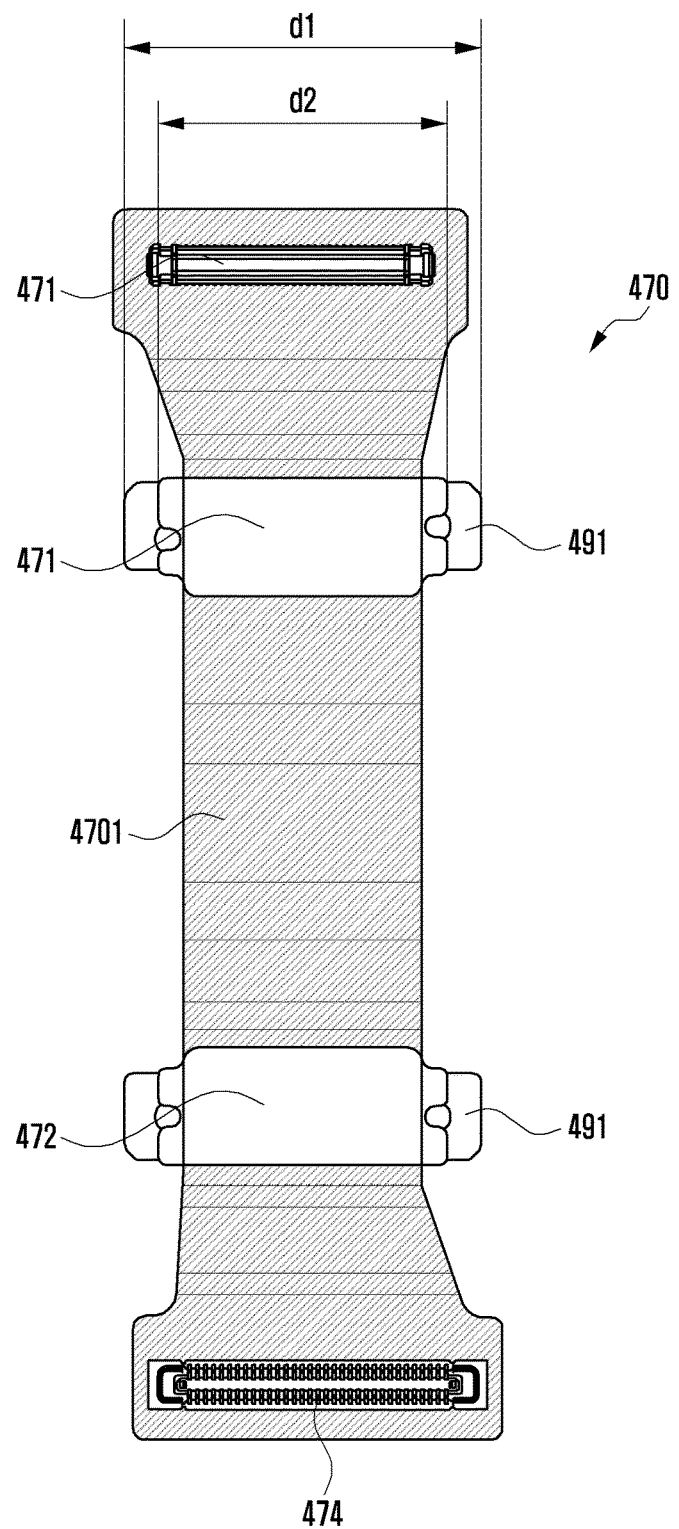
FIG. 7A is a diagram viewed from one side of a wiring member in which a reinforcing member is disposed according to various embodiments of the disclosure.

FIG. 7A is a diagram viewed from one side of the wiring member 470 in which the reinforcing member 490 is disposed according to various embodiments of the disclosure.

Figure 7B:
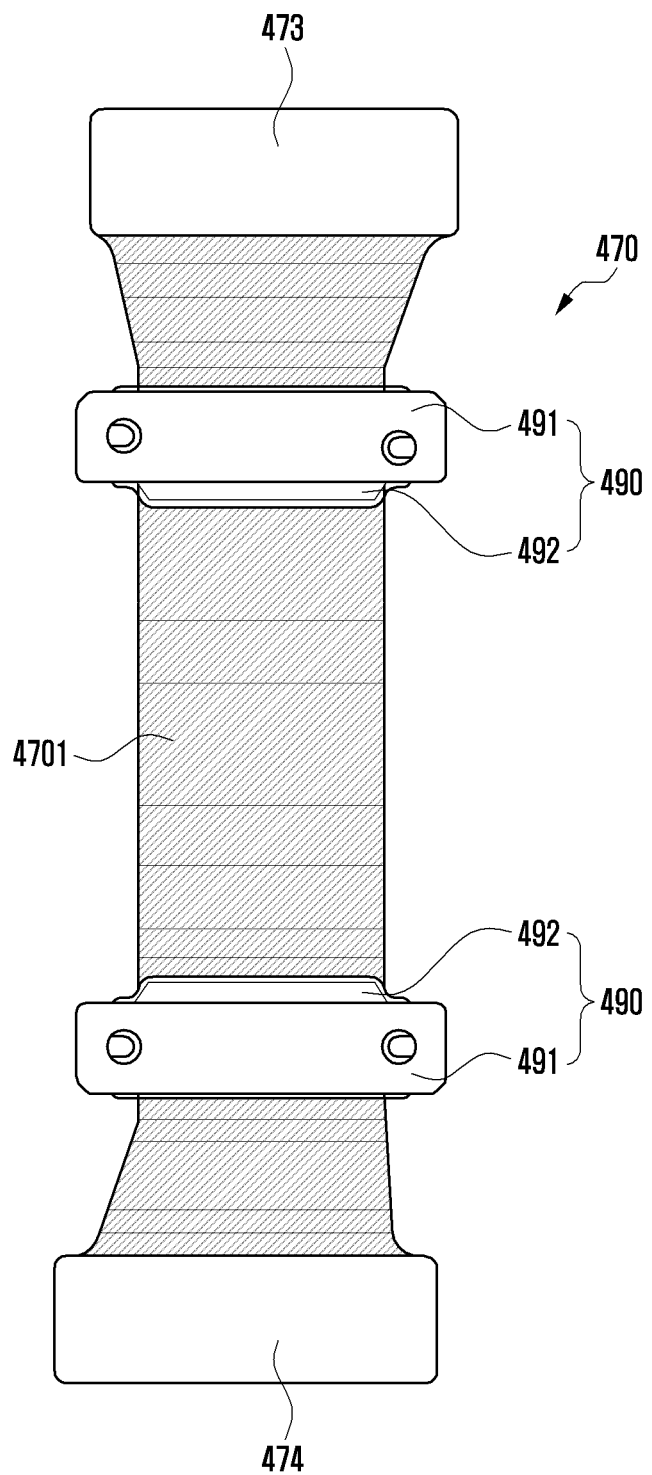
FIG. 7B is a diagram viewed from the other side of a wiring member in which a reinforcing member is disposed according to various embodiments of the disclosure.

FIG. 7B is a diagram viewed from the other side of the wiring member 470 in which the reinforcing member 490 is disposed according to various embodiments of the disclosure.

Figure 7C:
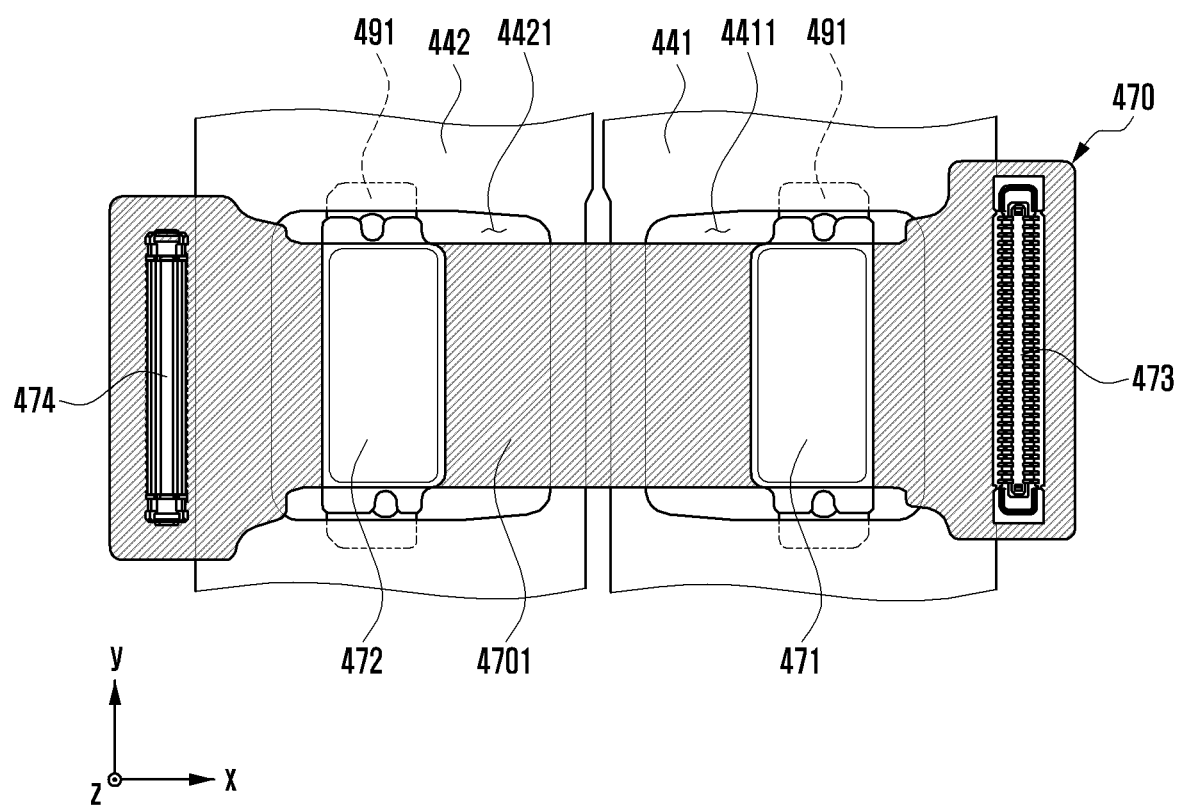
FIG. 7C is a diagram illustrating a state in which a reinforcing member fixed to a wiring member is regulated by hinge plates according to various embodiments of the disclosure.

FIG. 7C is a diagram illustrating a state in which the reinforcing member 490 fixed to the wiring member 470 is regulated by the hinge plates 441 and 442 according to various embodiments of the disclosure.

Referring to FIGS. 7A to 7C, a width d1 of the locking plate 491 may be formed to be larger than a width d2 of the first fixing portion 471. According to one embodiment, the locking plate 491 may be formed to have a width (e.g., flange) extended in a y-axis direction between the first hinge plate 441 and the first support member (e.g., the first support member 431 of FIG. 5) to be caught in an edge of the first opening 4411. Accordingly, the first fixing portion 471 is attached to the first support member 441 between the first hinge plate 441 and the first support member (e.g., the first support member 441 of FIG. 5), and even if an adhesive force with the first support member 441 is released by a repulsive force of the bendable portion 4701 of the wiring member 470, the first fixing portion 471 is caught in the edge of the first opening 4411 by the relatively wide width of the locking plate 491; thus, a phenomenon in which the first fixing portion 471 protrudes to the outside of the first opening 4411 may be prevented. According to one embodiment, a phenomenon in which the second fixing portion 472 protrudes to the outside of the third opening 4421 by the locking plate 491 may also be prevented. According to one embodiment, the support plate 492 may be formed in substantially the same shape as that of the first fixing portion 471.

Figure 8:
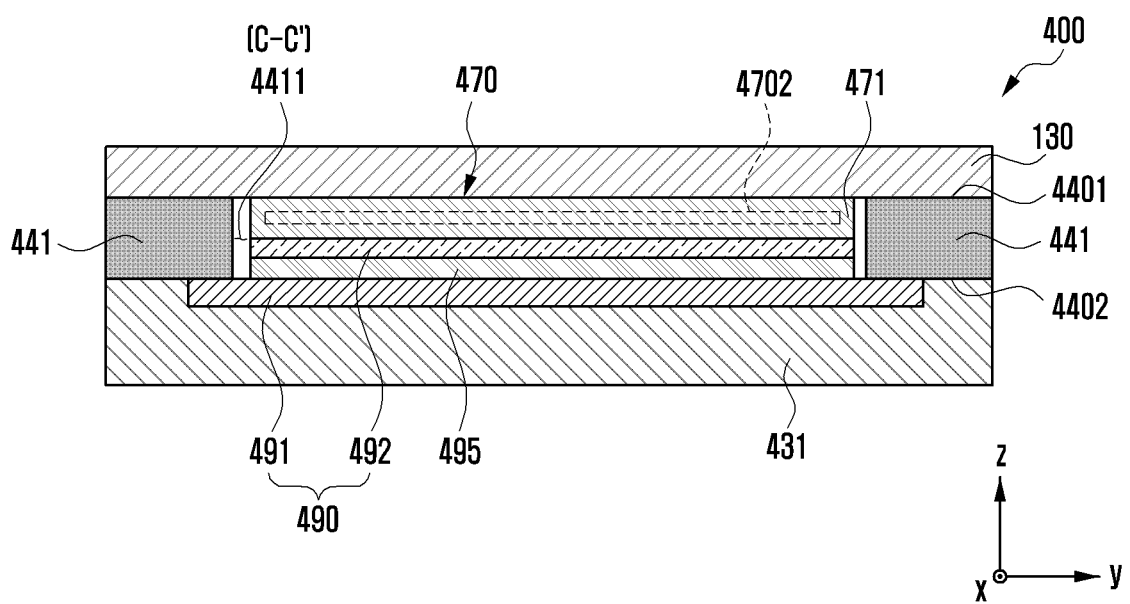
FIG. 8 is a partial cross-sectional view of an electronic device illustrating a stacked structure of wiring members taken along line C-C' of FIG. 4B according to various embodiments of the disclosure.

FIG. 8 is a partial cross-sectional view of an electronic device illustrating a stacked structure of wiring members 470 taken along line C-C' of FIG. 4B according to various embodiments of the disclosure.

Referring to FIG. 8, the first hinge plate 441 may include a front surface 4401 facing the display 130 and a rear surface 4402 facing in a direction opposite to that of the front surface 4401. According to an embodiment, the front surface 4401 of the first hinge plate 441 may support the display 130. According to one embodiment, the rear surface 4402 of the first hinge plate 441 may at least partially face the first support member 431. According to one embodiment, at least a portion of the first fixing portion 471 of the wiring member 470 in which the electrical wiring 4702 is embedded may be received through the first opening 4411 formed in the first hinge plate 441. According to an embodiment, the electronic device 400 may include the reinforcing member 490 disposed in the first fixing portion 471 between the first fixing portion 471 and the first support member 431. According to one embodiment, the reinforcing member 490 may include a locking plate 491 and a support plate 492 disposed between the locking plate 491 and the first fixing portion 471 and fixed through an adhesive layer 495. According to an embodiment, the locking plate 491 may be fixed to the first support member 431 through an adhesive member (e.g., double-sided tape). Accordingly, the first fixing portion 471 may be fixed to a surface of the first support member 431 through the reinforcing member 490. Although a fixing force of the adhesive member cannot receive all of a repulsive force of the bendable portion 4701 of the wiring member 470, when the wiring member 470 is first assembled, the fixing force serves to temporarily fix the first fixing portion 471 to the first support member 431, thereby contributing to improvement of assembly.

According to various embodiments, the locking plate 491 may be formed to have at least partially a width greater than that of the first opening 4411. According to one embodiment, the locking plate 491 may be formed to have a width greater than that of the first opening 4411 in the illustrated x-axis direction and/or y-axis direction. Accordingly, when the reinforcing member 490 is disposed between the first fixing portion 471 and the first support member 431, an extended width portion of the locking plate 491 may receive the support of the rear surface 4402 of the first hinge plate 441, whereby the first fixing portion 471 may be prevented from protruding from the first opening 4411 in the display direction (e.g., the z-direction).

Figure 9:
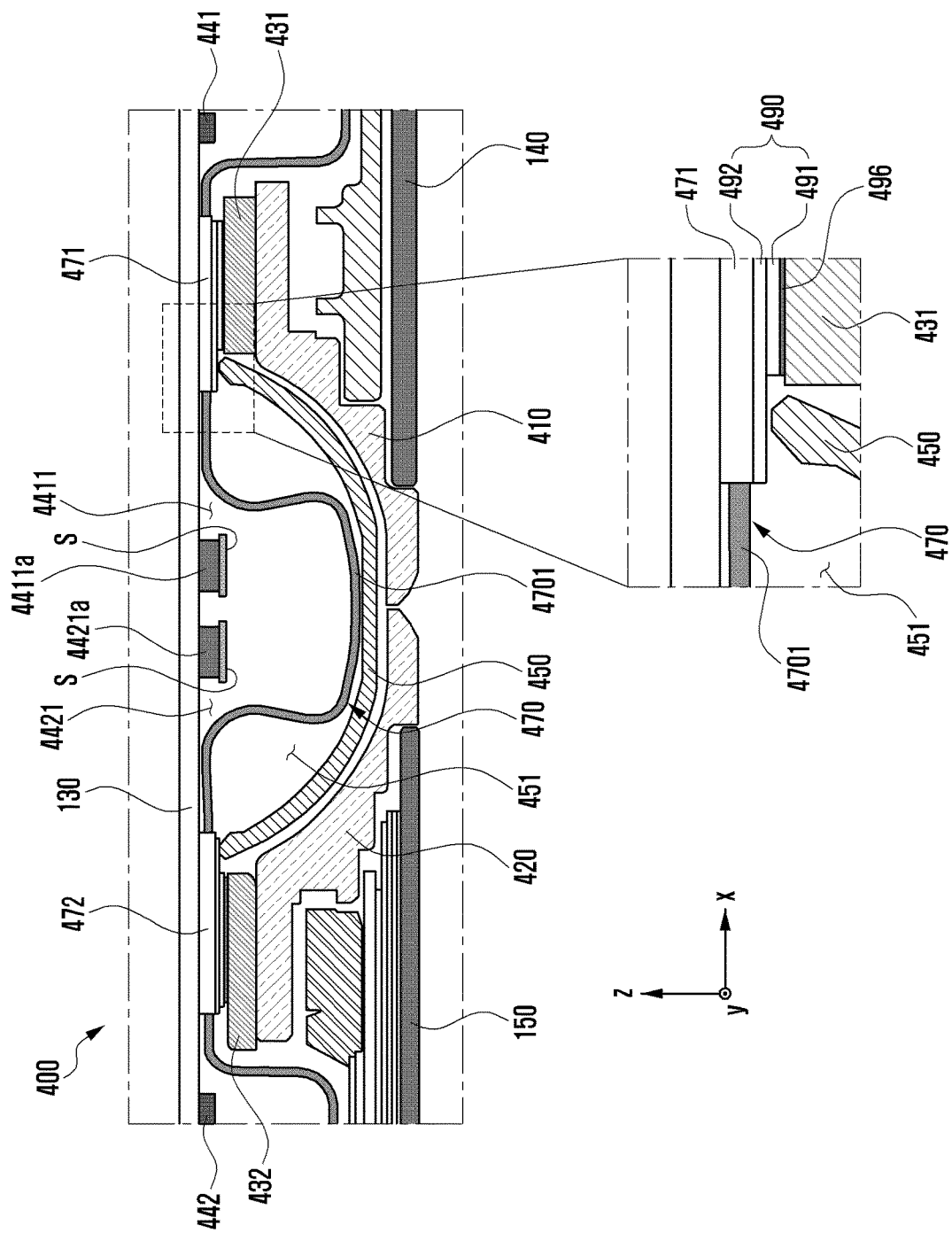
FIG. 9 is a partial cross-sectional view illustrating an electronic device in which a wiring member is disposed according to various embodiments of the disclosure.

FIG. 9 is a partial cross-sectional view illustrating an electronic device 400 in which a wiring member 470 is disposed according to various embodiments of the disclosure. FIG. 9 is a cross-sectional view illustrating the electronic device 400 taken along line B-B' of FIG. 4B.

Referring to FIG. 9, the electronic device 400 may include a wiring member 470 extended to a first housing 410 (e.g., the first housing structure 110 of FIG. 3), an internal space 451 of a hinge cover 450, and a second housing 420 (e.g., the second housing structure 120 of FIG. 3). According to one embodiment, the wiring member 470 may include a first fixing portion 471 whose at least a portion is disposed to be received through the first opening 4411 formed in the first hinge plate 441 between the first hinge plate 441 and the first support member 431. According to an embodiment, the first fixing portion 471 may include a reinforcing member 490 disposed between the first fixing portion 471 and the first support member 431. In another embodiment, the first support member 431 and the first housing 410 may be integrally formed. In another embodiment, the first support member 431 may be replaced with the transformed first housing 410. According to one embodiment, the reinforcing member 490 may include a locking plate 491 formed to be larger than the first opening 4411 in a y-axis direction and a support plate 492 formed in substantially the same size as that of the first fixing portion 471 between the locking plate 491 and the first fixing portion 471. In another embodiment, the support plate 492 may be formed to be larger than the locking plate 491 in an x-axis direction.

According to various embodiments, when the display 130 is viewed from above, the support plate 492 may be formed in a size that may be overlapped with an end portion of the hinge cover 450 in a state in which the first housing 410 is fully unfolded from the second housing 420. Accordingly, even when the first housing 410 is fully unfolded, the end portion of the hinge cover 450 is in contact with the support plate 492; thus, the corresponding portion of the wiring member 470 may be protected. According to one embodiment, the reinforcing member 490 disposed in the second fixing portion 472 may also have substantially the same disposition structure.

Figure 10A:
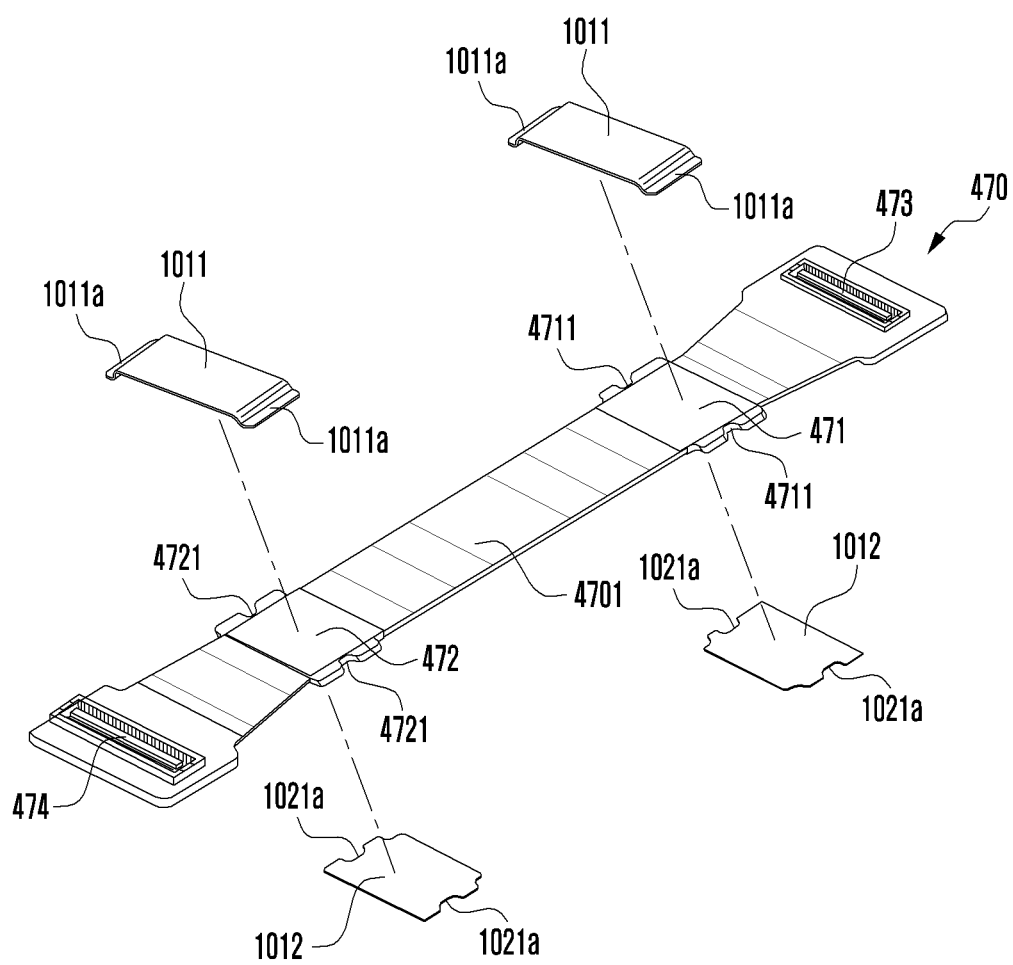
FIG. 10A is an exploded perspective view illustrating a reinforcing member disposed in a wiring member according to various embodiments of the disclosure.

FIG. 10A is an exploded perspective view of reinforcing members 1011 and 1012 disposed in a wiring member 470 according to various embodiments of the disclosure.

Figure 10B:
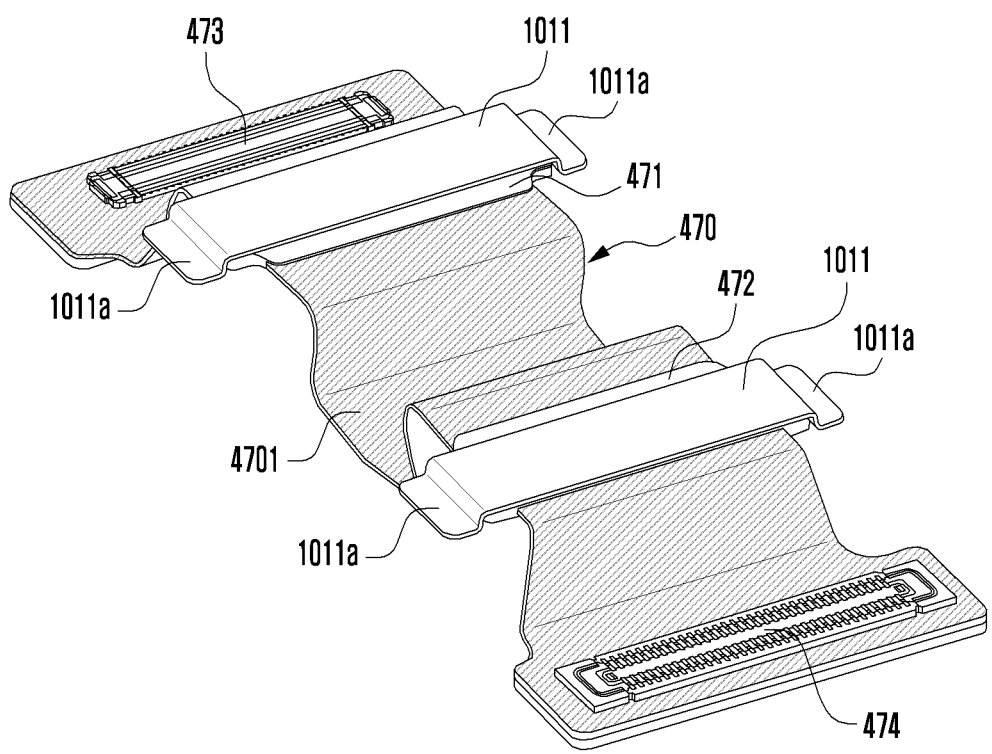
FIG. 10B is a perspective view illustrating a wiring member in which a reinforcing member is disposed according to various embodiments of the disclosure.

FIG. 10B is a perspective view of a wiring member in which a reinforcing member 1011 is disposed according to various embodiments of the disclosure.

Because the wiring member 470 of FIGS. 10A and 10B has substantially the same configuration as that of the wiring member 470 of FIG. 6, a detailed description thereof is omitted.

Referring to FIGS. 10A and 10B, the reinforcing members 1011 and 1012 may include a locking plate 1011 and support plate 1012 disposed in opposite directions to each other with the first fixing portion 471 of the wiring member 470 interposed therebetween. For example, the first fixing portion 471 may be disposed between the locking plate 1011 and the support plate 1012. According to one embodiment, the locking plate 1011 may include a flange 1011a disposed to enclose the first fixing portion 471 at one side of the first fixing portion 471 and extended in opposite directions to each other. An overall width of the locking plate 1011 including the flange 1011a may be formed to have a greater width than that of the above-described first opening (e.g., the first opening 4411 of FIG. 5). According to one embodiment, the support plate 1012 may be disposed to have substantially the same shape as that of the first fixing portion 471 in the other side of the first fixing portion 471. According to an embodiment, the locking plate 1011 and/or the support plate 1012 may be fixed to the first fixing portion 471 through an adhesive member (e.g., double-sided tape).

According to various embodiments, the support plate 1012 may include a guide groove 1012*a* formed in a position corresponding to at least one groove 4711 and 4721 formed in the first fixing portion 471 and the second fixing portion 472. Accordingly, when the support plate 1012 is fixed to the first fixing portion 471 and the second fixing portion 472, a fixing position thereof may be aligned through the guide groove 1012*a* of the support plate 1012.

Figure 11:
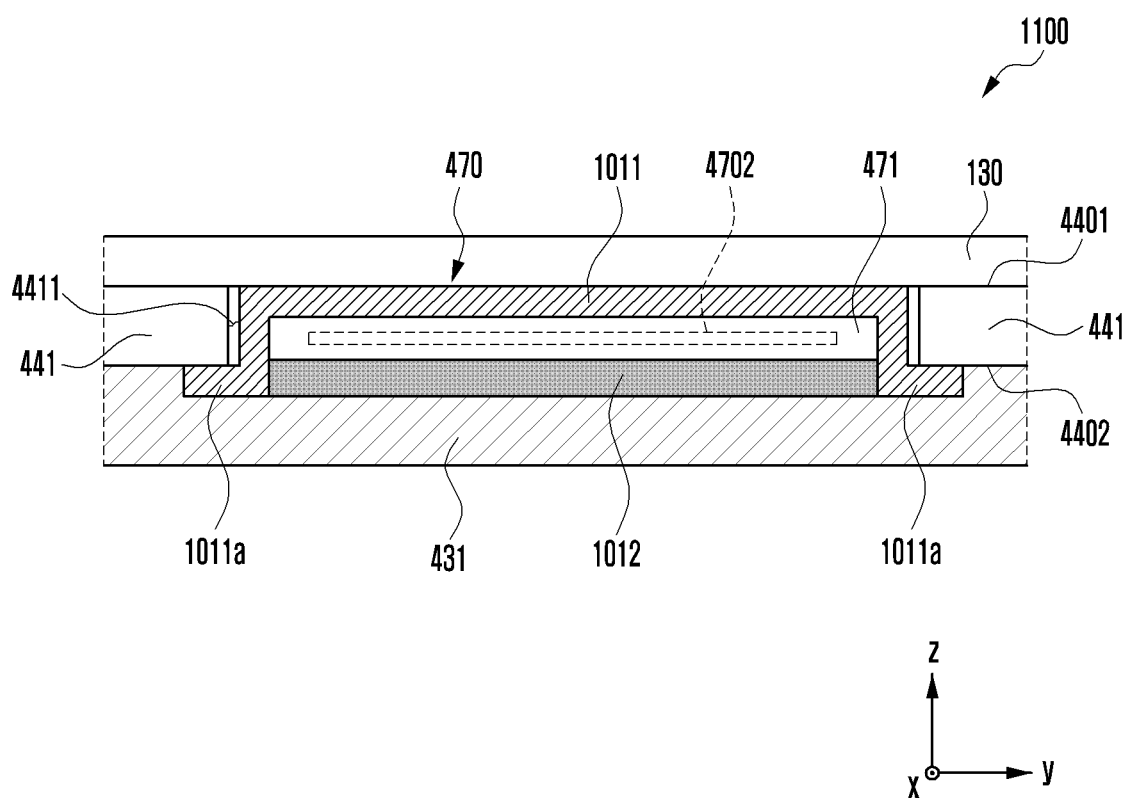
FIG. 11 is a partial cross-sectional view illustrating an electronic device in which the wiring member of FIG. 10B is disposed according to various embodiments of the disclosure.

FIG. 11 is a partial cross-sectional view illustrating an electronic device 1100 in which the wiring member 470 of FIG. 10B is disposed according to various embodiments of the disclosure.

The electronic device 1100 of FIG. 11 may be at least partially similar to the electronic device 100 of FIG. 3 or the electronic device 400 of FIG. 4A, or may include other components of the electronic device.

Referring to FIG. 11, the electronic device 1100 may include a wiring member 470 including a first fixing portion 471 disposed between a locking plate 1011 and a support plate 1012. According to one embodiment, the first fixing portion 471, the locking plate 1011, and the support plate 1012 of the wiring member 470 may be disposed through the first opening 4411 of the first hinge plate 441. According to an embodiment, the support plate 1012 may be attached to the first support member 431 through an adhesive member (e.g., double-sided tape). According to one embodiment, a flange 1011*a* of the locking plate 1011 encloses the first fixing portion 471 and is disposed to receive the support of the rear surface 4402 of the first hinge plate 441; thus, the first fixing portion 471 may be prevented from protruding from the first opening 4411 in the display direction (e.g., the z-direction). According to one embodiment, the support plate 1012 may perform substantially the same function as that of the support plate 492 of FIG. 9. According to an embodiment, the reinforcing members 1011 and 1012 disposed in the second fixing portion 472 may also have substantially the same disposition structure.

Figure 12A:
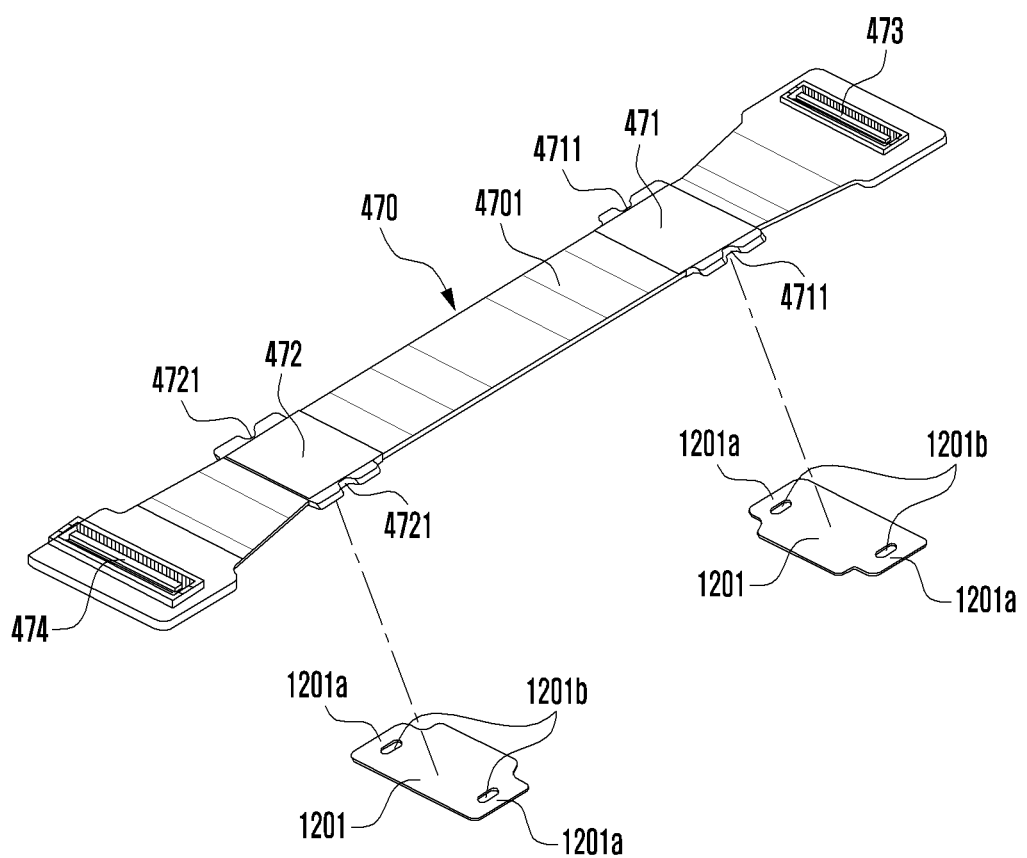
FIG. 12A is an exploded perspective view illustrating a reinforcing member disposed in a wiring member according to various embodiments of the disclosure.

FIG. 12A is an exploded perspective view illustrating a reinforcing member 1201 disposed in the wiring member 470 according to various embodiments of the disclosure.

Figure 12B:
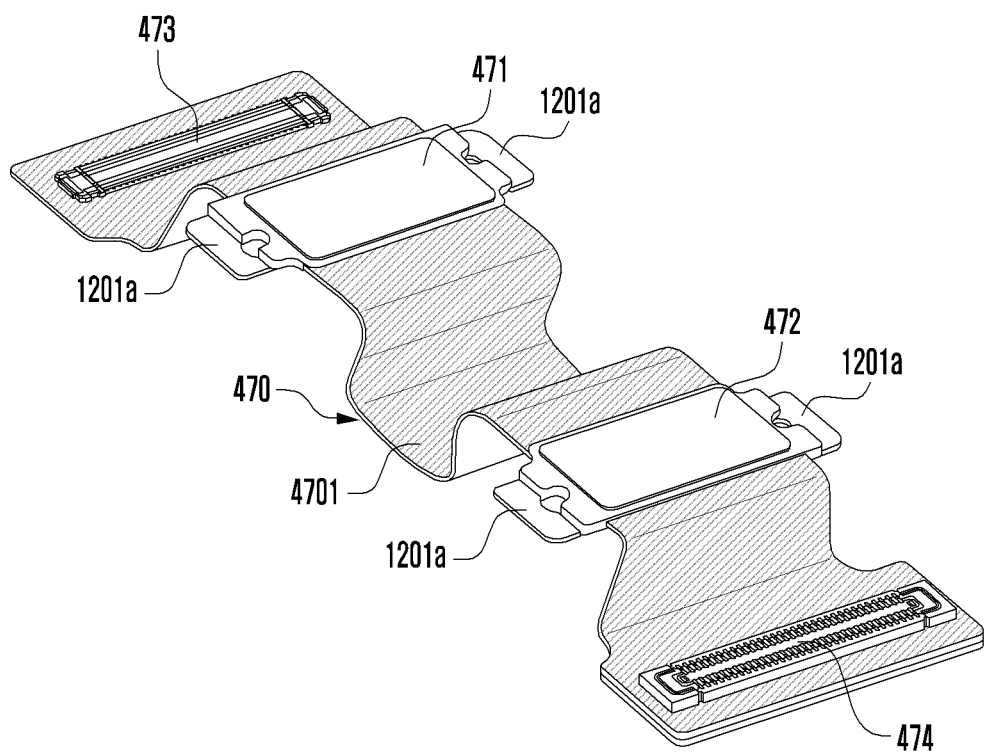
FIG. 12B is a perspective view illustrating a wiring member in which a reinforcing member is disposed according to various embodiments of the disclosure.

FIG. 12B is a perspective view illustrating a wiring member 470 in which a reinforcing member 1201 is disposed according to various embodiments of the disclosure.

Because the wiring member 470 of FIGS. 12A and 12B has substantially the same configuration as that of the wiring member 470 of FIG. 6, a detailed description thereof is omitted.

Referring to FIGS. 12A and 12B, the wiring member 470 may include a reinforcing member 1201 disposed in the first fixing portion 471. According to an embodiment, the reinforcing member 1201 may be attached to the first fixing portion 471 through an adhesive member (e.g., double-sided tape). According to one embodiment, the reinforcing member 1201 includes an at least partially extended flange 1201*a*, thereby being formed to be larger than a first opening (e.g., the first opening of FIG. 5) of a first hinge plate (e.g., the first hinge plate 441 of FIG. 9). According to one embodiment, the reinforcing member 1201 may be formed in a size in which an end portion of a hinge cover (e.g., the hinge cover 450 of FIG. 9) may be at least partially in contact in a state in which the first housing (e.g., the first housing 410 of FIG. 9) is unfolded.

According to various embodiments, the reinforcing member 490 may include a guide hole 4911 formed at a position corresponding to at least one groove 4711 and 4721 formed in the first fixing portion 471 and the second fixing portion 472. Accordingly, when the reinforcing member 490 is fixed to the first fixing portion 471 and the second fixing portion 472, fixing positions thereof may be aligned through the guide hole 4911 of the reinforcement member.

Figure 13:
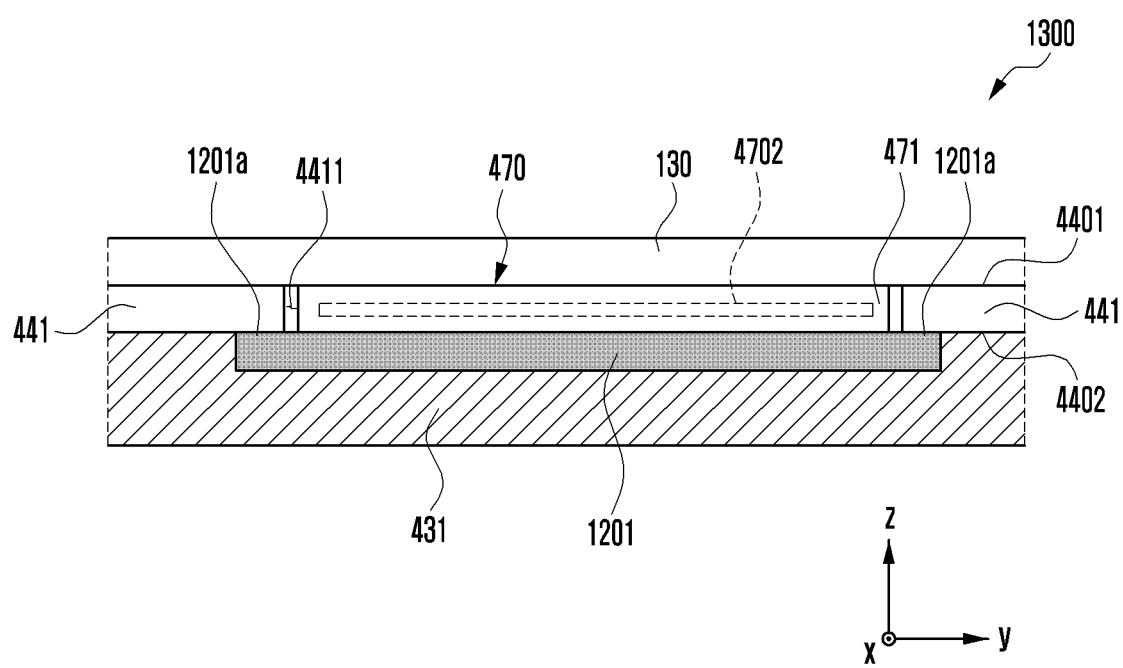
FIG. 13 is a partial cross-sectional view illustrating an electronic device in which the wiring member of FIG. 12B is disposed according to various embodiments of the disclosure.

FIG. 13 is a partial cross-sectional view illustrating an electronic device 1300 in which the wiring member 470 of FIG. 12B is disposed according to various embodiments of the disclosure.

The electronic device 1300 of FIG. 13 may be at least partially similar to the electronic device 100 of FIG. 3 or the electronic device 400 of FIG. 4A, or may include other components of the electronic device.

Referring to FIG. 13, the electronic device 1300 may include a wiring member 470 including a single reinforcing member 1201. According to an embodiment, the reinforcing member 1201 attached to a first fixing portion 471 of the wiring member 470 may be attached to a first support member 431 through an adhesive member (e.g., double-sided tape). According to one embodiment, a flange 1201*a* of the reinforcing member 1201 may be disposed to receive the support of a rear surface 4402 of a first hinge plate 441 between the first hinge plate 441 and the first support member 431. Accordingly, the first fixing portion 471 may be prevented from protruding from a first opening 4411 in the display direction (e.g., the z-direction). According to one embodiment, the reinforcing member 1201 disposed in a second fixing portion 472 may also have substantially the same disposition structure.

Figure 14A:
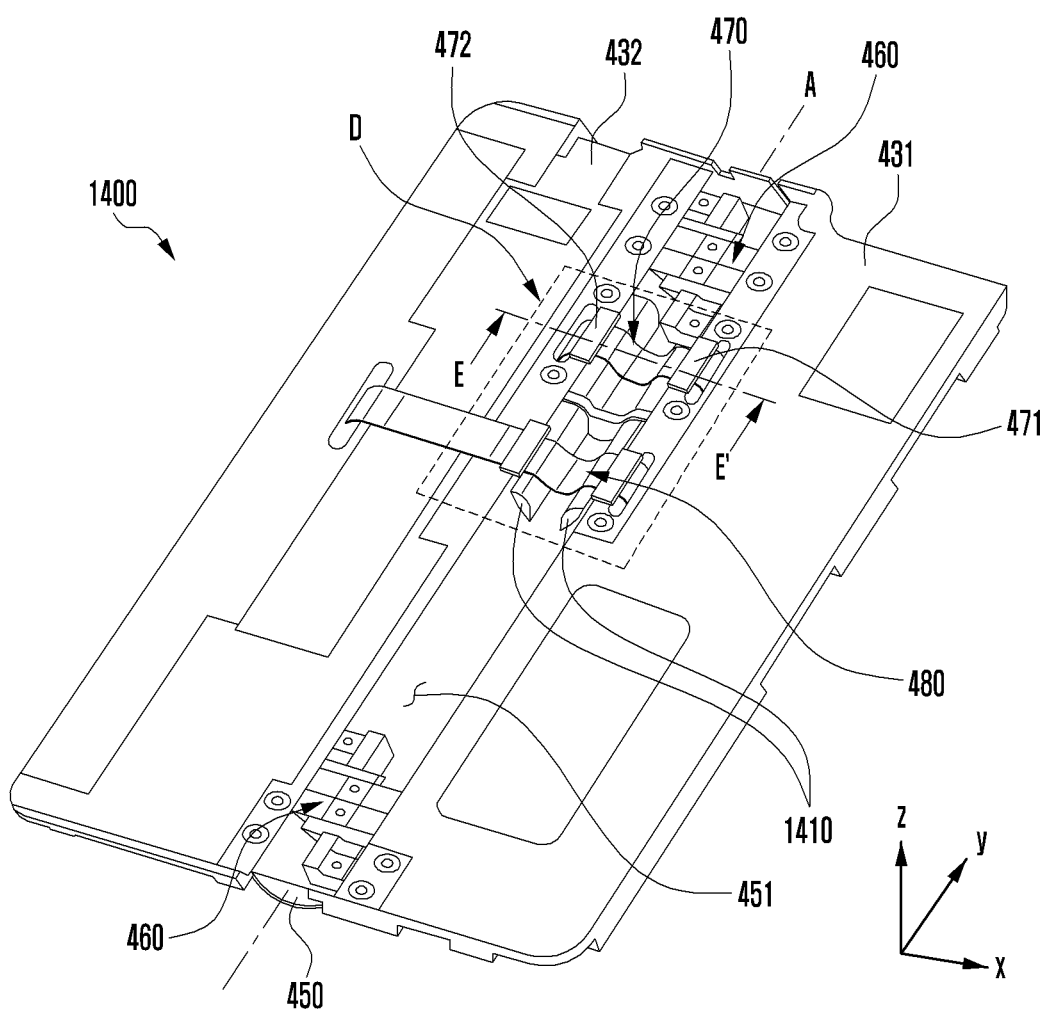
FIG. 14A is an exploded perspective view illustrating a state in which a wiring member is disposed through a hinge cover and support members according to various embodiments of the disclosure.

FIG. 14A is an exploded perspective view illustrating a state in which wiring members 470 and 480 are disposed through the hinge cover 450 and the support members 441 and 442 according to various embodiments of the disclosure.

Figure 14B:
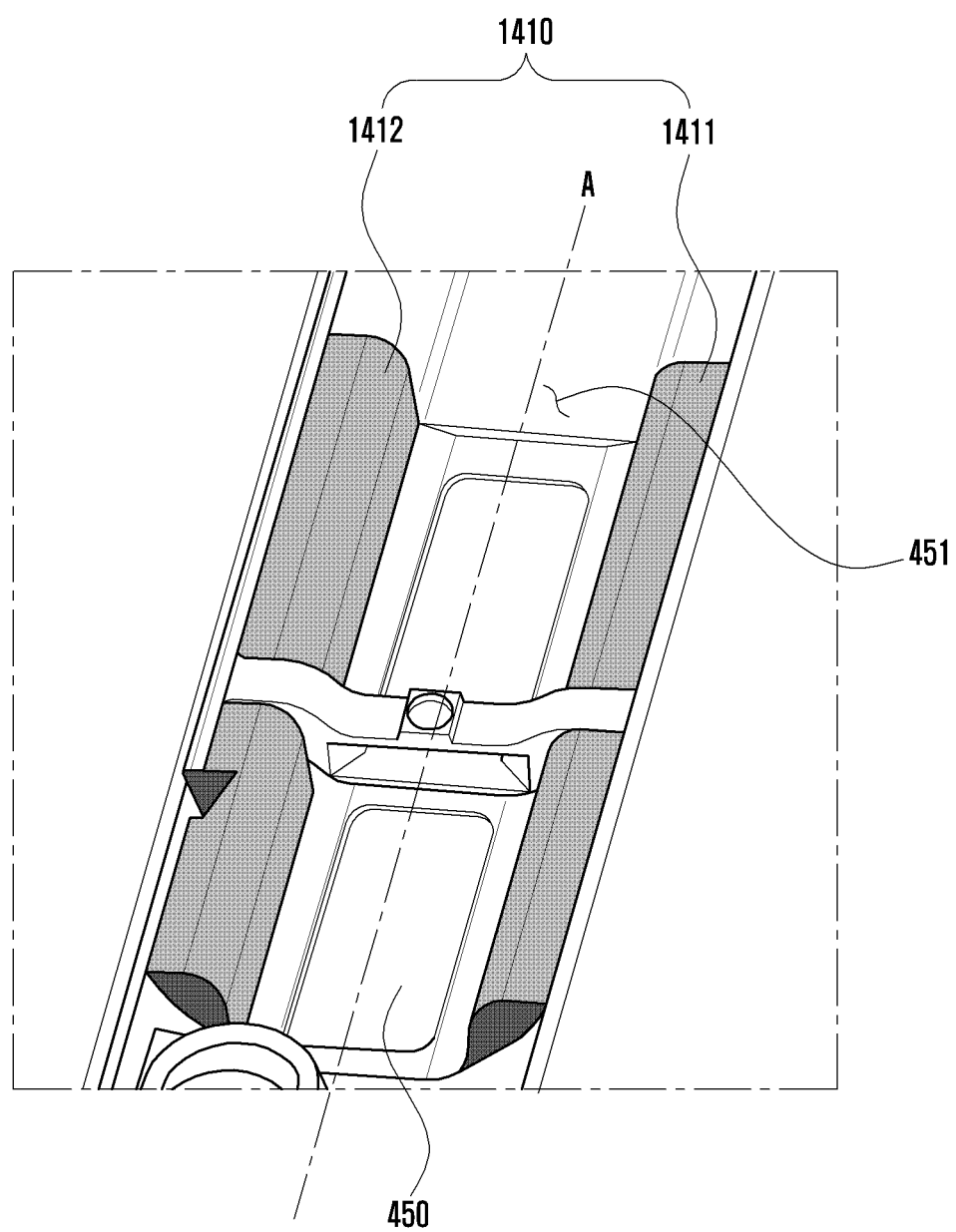
FIG. 14B is a partial perspective view illustrating a region D of the hinge cover of FIG. 14A according to various embodiments of the disclosure.

FIG. 14B is a partial perspective view illustrating a region D of the hinge cover 450 of FIG. 14A according to various embodiments of the disclosure.

The electronic device 1400 of FIG. 14A may be at least partially similar to the electronic device 100 of FIG. 3 or the electronic device 400 of FIG. 4A, or may further include other components of the electronic device.

Hereinafter, in describing the drawings, because a disposition configuration of a hinge cover 450 including a hinge module 460 and a pair of hinge plates (e.g., the hinge plates 441 and 442 of FIG. 4A) fixed to the hinge module 460, a pair of support members 431 and 432 fixed to the pair of hinge plates, and at least one wiring member 470 and 480 extended therethrough is substantially the same as that of FIGS. 4A and 4B, a detailed description thereof is omitted.

Referring to FIGS. 14A and 14B, the hinge cover 450 may include at least one hinge module 460 and an internal space 451 capable of receiving at least a portion of the wiring members 470 and 480. According to one embodiment, the hinge cover 450 may be formed to have at least partially a curved surface in a state in which the first housing (e.g., a first housing 410 of FIG. 15A) and the second housing (e.g., a second housing 420 of FIG. 15A) are folded. For example, an inner surface of the hinge cover 450 may also be formed in a curved shape.

According to various embodiments, because a portion having an extra length capable of receiving folding and unfolding operations of a first housing (e.g., the first housing 410 of FIG. 15A and a second housing (e.g., the second housing 420 of FIG. 15A) should be disposed in the internal space 451 of the hinge cover 450, when the first wiring member 470 (hereinafter, referred to as a wiring member 470) is initially assembled, the corresponding portion of the wiring member 470 may be disposed (e.g., eccentrically disposed) to be excessively biased toward either side in the internal space 451 by the curved hinge cover. In this case, the corresponding portion of the wiring member 470 disposed to be excessively biased in the internal space 451 of the hinge cover 450 may be damaged because of interference of peripheral members during a frequent closing or unfolding of the electronic device 1400.

According to various embodiments of the disclosure, when the wiring member 470 is disposed in the internal space 451 of the hinge cover 450, in order to prevent the wiring member 470 from being excessively biased toward either side, the hinge cover 450 may include a support dummy assembly 1410 protruded into the internal space 451. According to one embodiment, the support dummy assembly 1410 may include a pair of support dummies 1411 and 1412 disposed in a position overlapped with the wiring member 470 in the internal space 451 of the hinge cover 450 when the display (e.g., the display 130 of FIG. 15A) is viewed from above. According to one embodiment, the pair of support dummies 1411 and 1412 may include a first support dummy 1411 protruded to one side and a second support dummy 1412 protruded to the other side in the internal space of the hinge cover 450 based on the z-axis perpendicular to a rotation shaft A. According to one embodiment, the wiring member 470 may be disposed between the first support dummy 1411 and the second support dummy 1412, and a phenomenon in which the spare portion of the wiring member 470 is excessively biased to either side may be reduced by a pair of support dummies 1411 and 1412. According to one embodiment, the pair of support dummies 1411 and 1412 are formed only in an area overlapped with the wiring member 470 among the internal space 451 of the hinge cover 450 when the display is viewed from above; thus, the remaining area of the hinge cover 450 may be utilized as a space in which, for example, at least one hinge module 460 and/or other structures may be disposed.

Figure 15A:
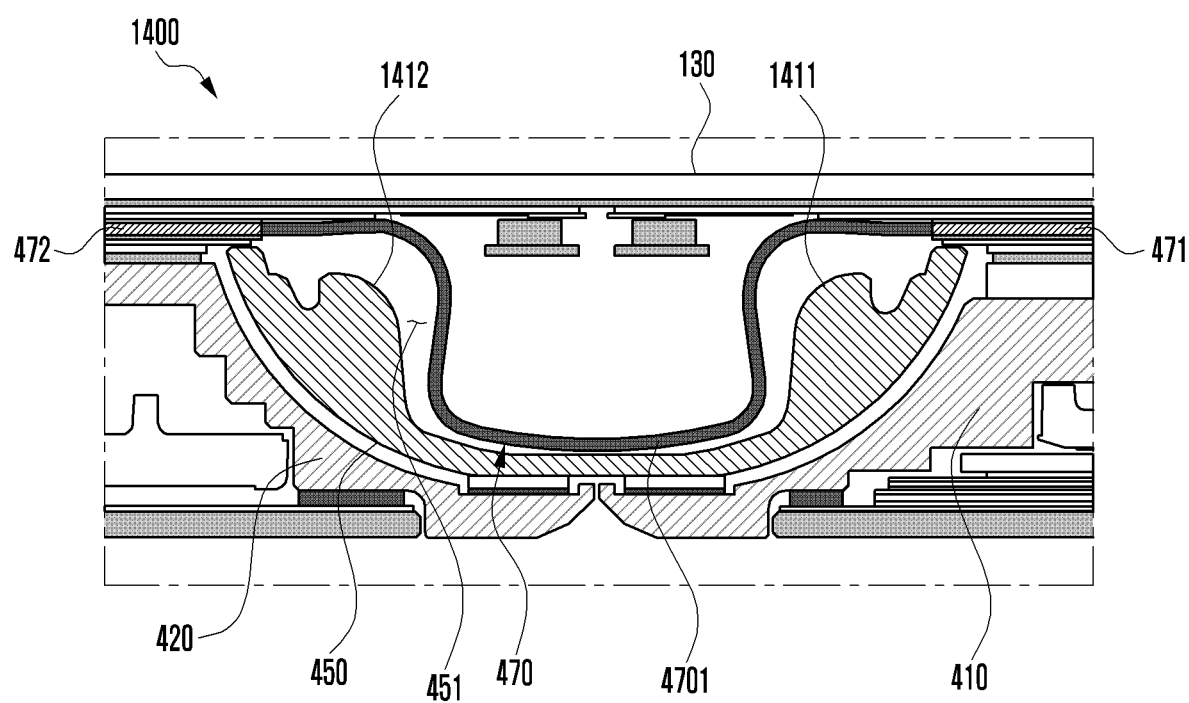
FIGS. 15A to 15C are partial cross-sectional views illustrating a stacked structure of wiring members taken along line E-E' of FIG. 14A according to various embodiments of the disclosure.
Figure 15B:
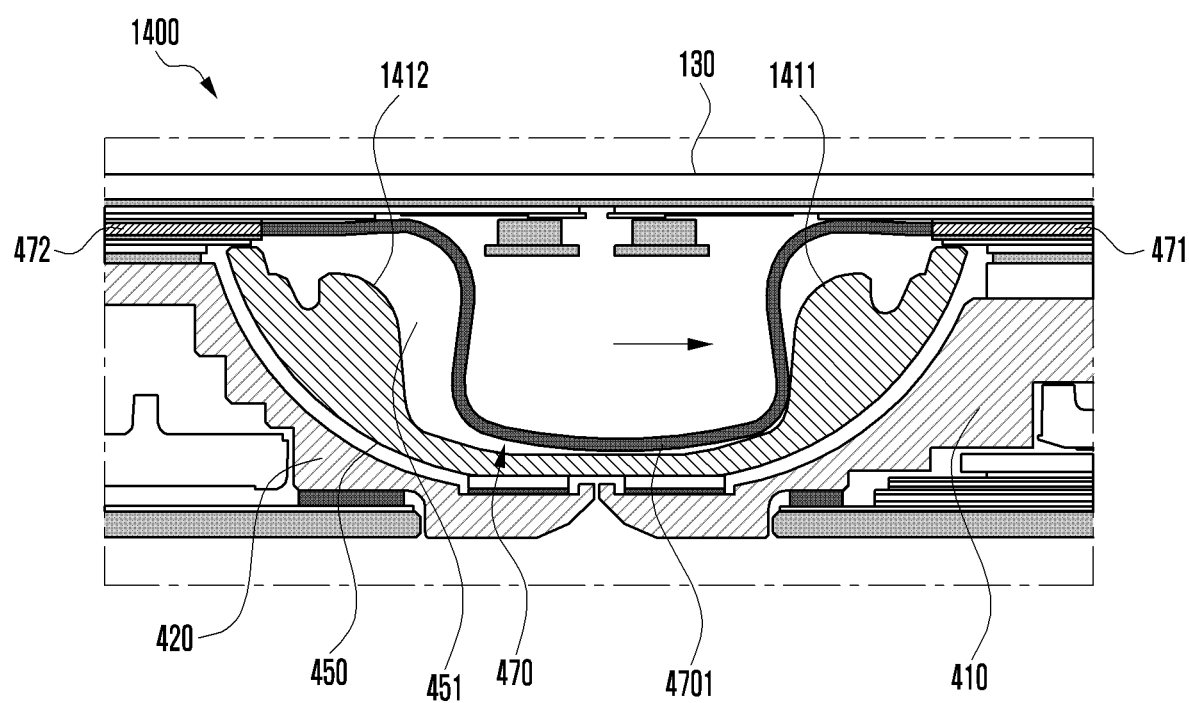
Figure 15C:
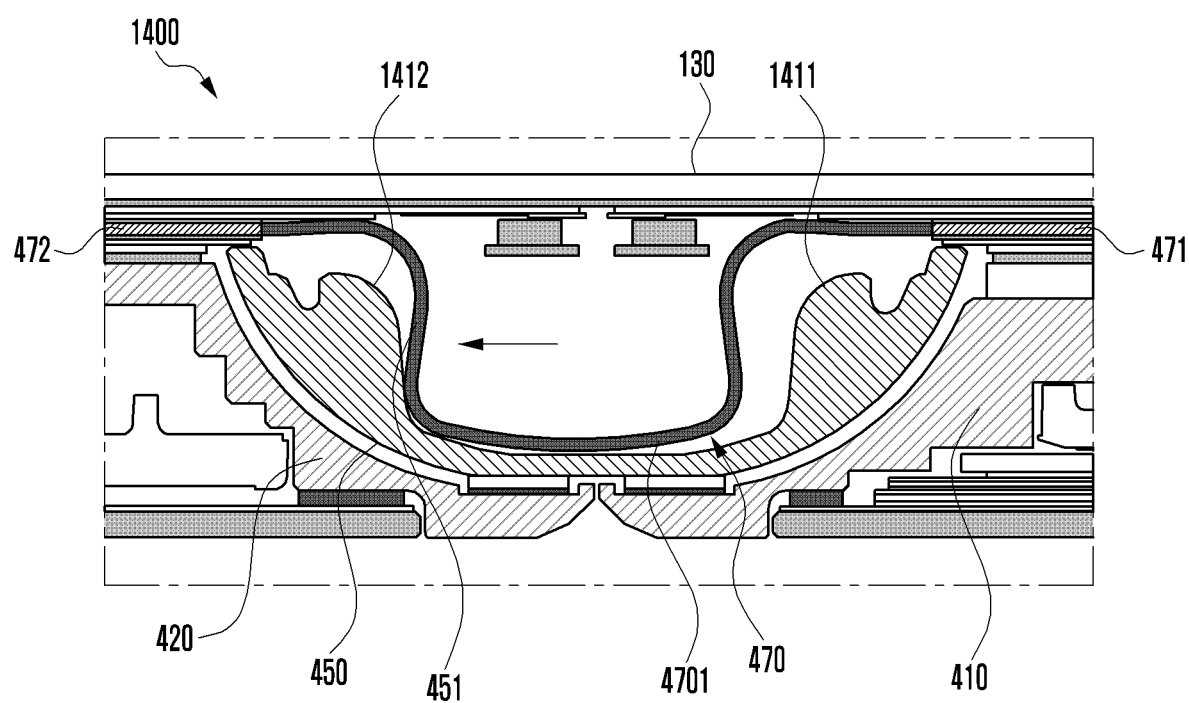

FIGS. 15A to 15C are partial cross-sectional views illustrating a stacked structure of the wiring member 470 taken along line E-E' of FIG. 14A according to various embodiments of the disclosure.

Referring to FIG. 15A, an electronic device 1400 may include a hinge cover 450, a first housing 410 rotatably disposed at one side of the hinge cover 450, and a second housing 420 rotatably fixed to the other side thereof. According to an embodiment, the wiring member 470 may be extended through the first housing 410, the hinge cover 450, and the second housing 420. According to one embodiment, the wiring member 470 may be guided to be centrally disposed based on the substantially z-axis when initially assembled through a pair of spaced support dummies 1411 and 1412 in the internal space 451 of the hinge cover 450.

Referring to FIGS. 15B and 15C, the wiring member 470 may be disposed to be slightly biased to the right and/or the left in the internal space 451 of the hinge cover 450, but as excessive biasing to either side is reduced through a pair of support dummies 1411 and 1412, damage of the wiring member 470 according to folding and/or unfolding operations of the electronic device may be prevented. According to one embodiment, by adjusting a protrusion amount of the hinge dummies 1411 and 1412 within a range in which the wiring member 470 may be smoothly operated, an unintentional eccentric disposition of the wiring member 470 may be reduced. In another embodiment, an intentional eccentric disposition in which the wiring member 470 is biased toward one side may be induced by varying a protrusion amount of each of the hinge dummies 1411 and 1412.

According to various embodiments, the electronic device (e.g., the electronic device 100 of FIG. 3) may include a foldable housing, wherein the foldable housing includes a hinge structure (e.g., the hinge structure 264 of FIG. 3), wherein the hinge structure includes a hinge cover (e.g., the hinge cover 450 of FIG. 5) to which at least one hinge module (e.g., the hinge module 460 of FIG. 4A) is fixed in an internal space (e.g., the internal space 451 of FIG. 4A); a first hinge plate (e.g., the first hinge plate 441 of FIG. 5) rotatably fixed to the hinge module and including a first opening (e.g., the first opening 4411 of FIG. 5) connected to the internal space; and a second hinge plate (e.g., the second hinge plate 442 of FIG. 5) rotatably fixed to the hinge module and including a second opening (e.g., the third opening 4421 of FIG. 5) connected to the internal space, a first housing (e.g., the first housing structure 110 of FIG. 1) including a first surface (e.g., the first surface 111 of FIG. 1) connected to the first hinge plate and facing in a first direction, a second surface (e.g., the second surface 112 of FIG. 1) facing in a direction opposite to that of the first surface, and a first side member (e.g., the first side member 113 of FIG. 1) enclosing a first space between the first surface and the second surface; and a second housing (e.g., the second housing structure 120 of FIG. 1) including a third surface (e.g., the third surface 121 of FIG. 1) connected to the second hinge plate and facing in a second direction, a fourth surface (e.g., the fourth surface 122 of FIG. 1) facing in a direction opposite to that of the third surface, and a second side member (e.g., the second side member 123 of FIG. 1) enclosing a second space between the third surface and the fourth surface, wherein the first housing and the second housing are foldably coupled to each other along the hinge structure so as to at least partially overlap in a folded state; a flexible display (e.g., the display 130 of FIG. 1) disposed to at least partially cross from the first surface through the second surface; and a wiring member (e.g., the first wiring member 470 of FIG. 5) configured to electrically connect a first electric structure (e.g., the first printed circuit board 171 of FIG. 3) of the first space and a second electric structure (e.g., the second printed circuit board 172 of FIG. 3) of the second space through the internal space of the hinge cover, wherein the wiring member includes a bendable portion (e.g., the bendable portion 4701 of FIG. 5); a first fixing portion (e.g., the first fixing portion 471 of FIG. 5) disposed to be exposed to the first opening of the first hinge plate in the bendable portion; a second fixing portion (e.g., the second fixing portion 472 of FIG. 5) disposed to be exposed to the second opening of the second hinge plate in the bendable portion; at least one first reinforcing member (e.g., the first reinforcing member 490 of FIG. 6) fixed to the first fixing portion and disposed to receive support of the first hinge plate between the first hinge plate and the first housing; and at least one second reinforcing member (e.g., the second reinforcing member 490 of FIG. 6) fixed to the second fixing portion and disposed to receive support of the second hinge plate between the second hinge plate and the second housing.

According to various embodiments, the first fixing portion may be disposed not to protrude from a surface of the first hinge plate through the first opening, and the second fixing portion may be disposed not to protrude from a surface of the second hinge plate through the second opening.

According to various embodiments, the first reinforcing member may include a locking plate (e.g., the locking plate 491 of FIG. 6) disposed between the first fixing portion and the first housing structure, and a support plate (e.g., the support plate 492 of FIG. 6) disposed between the first fixing portion and the locking plate, wherein the locking plate may be formed to have a width (e.g., the width d1 of FIG. 7A) at least partially larger than that of the first fixing portion so as to be caught by the first opening between the first hinge plate and the first housing.

According to various embodiments, the locking plate and the support plate may be fixed to each other through thermocompression bonding.

According to various embodiments, the locking plate may be fixed to the first housing through an adhesive member.

According to various embodiments, when the display is viewed from above, the support plate may be formed to include a portion overlapped with an end portion of the hinge cover in a state in which the first housing and the second housing are unfolded.

According to various embodiments, the first reinforcing member (e.g., the reinforcing members 1011 and 1012 of FIG. 10A) may include a locking plate (e.g., the locking plate 1011 of FIG. 10A) including a pair of flanges (e.g., the flange 1011a of FIG. 10A) at least partially enclosing the first fixing portion at one side of the first fixing portion, and having extended both ends and a support plate (e.g., the support plate 1012 of FIG. 10A) disposed at the other side of the first fixing portion, wherein the pair of flanges of the locking plate may be disposed to be caught by the first opening between the hinge plate and the first housing.

According to various embodiments, when the display is viewed from above, the support plate may be formed to include a portion overlapped with an end portion of the hinge cover in a state in which the first housing and the second housing are unfolded.

According to various embodiments, the first reinforcing member may include a locking plate (e.g., the locking plate 1201 of FIG. 12A) disposed in the first fixing portion and including a pair of flanges (e.g., the flanges 1201a of FIG. 12A) having extended both ends, wherein the pair of flanges of the locking plate may be disposed to be caught by the first opening between the hinge plate and the first housing.

According to various embodiments, when the display is viewed from above, the locking plate may be formed to include a portion overlapped with an end portion of the hinge cover in a state in which the first housing and the second housing are unfolded.

According to various embodiments, the first electrical structure may include a first printed circuit board disposed in the first space, and the second electrical structure may include a second printed circuit board disposed in the second space.

According to various embodiments, when the display is viewed from above, the electronic device may include at least one support dummy (e.g., the support dummy assembly 1410 of FIG. 14A) disposed in the internal space of the hinge cover and formed to protrude in an area overlapped with the wiring member.

According to various embodiments, the at least one support dummy may include a first support dummy (e.g., the first support dummy 1411 of FIG. 14B) protruded to one side based on a rotation shaft of the hinge structure and a second support dummy (e.g., the second support dummy 1412 of FIG. 14B) protruded to the other side based on the rotation shaft, wherein the bendable portion of the wiring member may be disposed between the first support dummy and the second support dummy, and a disposition position thereof may be determined by a protrusion shape of the first support dummy and the second support dummy.

According to various embodiments, the first housing may further include a first support member (e.g., the first support member 431 of FIG. 4A) at least partially extended from the first side member to the first space or structurally coupled to the first side member, wherein the first reinforcing member may be disposed between the first hinge plate and the first support member.

According to various embodiments, the second housing may further include a second support member (e.g., the second support member 432 of FIG. 4A) at least partially extended from the second side member to the second space, or structurally coupled to the second side member, wherein the second reinforcing member may be disposed between the second hinge plate and the second support member.

According to various embodiments, the electronic device (e.g., the electronic device 100 of FIG. 3) may include a foldable housing, wherein the foldable housing includes a hinge structure (e.g., the hinge structure 264 of FIG. 3), wherein the hinge structure includes a hinge cover (e.g., the hinge cover 450 of FIG. 5) to which at least one hinge module (e.g., the hinge module 460 of FIG. 4A) is fixed in an internal space (e.g., the internal space 451 of FIG. 5), and a first hinge plate (e.g., the first hinge plate 441 of FIG. 5) rotatably fixed to the hinge module and including a first opening connected to the internal space; and a second hinge plate (e.g., the second hinge plate 442 of FIG. 5) rotatably fixed to the hinge module so as to substantially close the internal space together with the first hinge plate in an unfolded state, a first housing (e.g., the first housing structure 110 of FIG. 1) including a first surface (e.g., the first surface 111 of FIG. 1) connected to the first hinge plate and facing in the first direction, a second surface (e.g., the second surface 112 of FIG. 1) facing in a direction opposite to that of the first surface, and a first side member (e.g., the first side member 113 of FIG. 1) enclosing a first space between the first surface and the second surface, a second housing (e.g., the second housing structure 120 of FIG. 1) including a third surface (e.g., the third surface 121 of FIG. 1) connected to the second hinge plate and facing in a second direction, a fourth surface (e.g., the fourth surface 122 of FIG. 1) facing in a direction opposite to that of the third surface, and a second side member (e.g., the second side member 123 of FIG. 1) enclosing a second space between the third surface and the fourth surface, wherein the first housing and the second housing are foldably coupled to each other along the hinge structure so as to at least partially overlap in a folded state; a flexible display (e.g., the display 130 of FIG. 1) disposed to cross at least partially from the first surface through the second surface; a wiring member (e.g., the first wiring member 470 of FIG. 5) configured to electrically connect a first electrical structure (e.g., the first printed circuit board 171 of FIG. 3) of the first space and a second electrical structure (e.g., the second printed circuit board 172 of FIG. 3) of the second space through the internal space of the hinge cover, and including at least partially a bendable portion (e.g., the bendable portion 4701 of FIG. 5); and at least one support dummy (e.g., the support dummy 1410 of FIG. 14A) disposed in the internal space of the hinge cover and formed to protrude in an area overlapped with the wiring member, when the display is viewed from above.

According to various embodiments, the first housing may further include a first support member (e.g., the first support member 431 of FIG. 4A) at least partially extended from the first side member to the first space or structurally coupled to the first side member, wherein the wiring member may be at least partially disposed between the first hinge plate and the first support member.

According to various embodiments, the second housing may further include a second support member (e.g., the second support member 432 of FIG. 4A) at least partially extended from the second side member to the second space or structurally coupled to the second side member, wherein the wiring member may be at least partially disposed between the second hinge plate and the second support member.

According to various embodiments, an inner surface in contact with the internal space of the hinge cover may be formed as a curved surface, the at least one support dummy may be formed to protrude from the inner surface in a direction of the internal space, and the bendable portion of the wiring member may be disposed to be supported through the at least one support dummy.

According to various embodiments, the at least one support dummy may include a first support dummy (e.g., the first support dummy 1411 of FIG. 14B) protruded to one side based on a rotation shaft of the hinge structure and a second support dummy (e.g., the second support dummy of FIG. 14B) protruded to the other side based on the rotation shaft, wherein the bendable portion of the wiring member may be disposed between the first support dummy and the second support dummy, and a disposition position thereof may be determined by a protrusion shape of the first support dummy and the second support dummy.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure.

The invention claimed is:

1. An electronic device comprising:
   a first housing;
   a second housing;
   a hinge module configured to connect the first housing and the second housing in a foldable manner;
   a flexible display disposed to be supported by the first housing and the second housing;
   a first hinge plate configured to connect at least a portion of the first housing to the hinge module, the first hinge plate including a first opening;
   a second hinge plate configured to connect at least a portion of the second housing to the hinge module, the second hinge plate including a second opening;
   a flexible printed circuit board (FPCB) extending from the first housing to the second housing;
   a first reinforcing member configured to fix a first portion of the FPCB with respect to the first hinge plate; and
   a second reinforcing member configured to fix a second portion of the FPCB with respect to the second hinge plate,
   wherein the first portion of the FPCB and at least a portion of the first reinforcing member are disposed within the first opening and the second portion of the FPCB and at least a portion of the second reinforcing member are disposed within the second opening.

2. The electronic device of claim 1, wherein each of the first reinforcing member and the second reinforcing member comprises:
   a support plate attached to the FPCB; and
   a locking plate attached to the support plate.

3. The electronic device of claim 2,
   wherein the locking plate comprises a pair of flanges extended in a direction opposite to each other, and
   wherein the locking plate is disposed to be caught in the first opening and the second opening through the pair of flanges.

4. The electronic device of claim 2, wherein a width of the support plate is the same as that of the FPCB.

5. The electronic device of claim 2, further comprising:
   a hinge cover including an inner space at least partially accommodating the hinge module,
   wherein the support plate is disposed to face an end portion of the hinge cover when the first housing and the second housing are in a flat state.

6. The electronic device of claim 5, wherein the hinge cover comprises at least one support dummy protruded from an area at least partially overlapped with the FPCB received in the inner space, when viewed from above a flexible display.

7. The electronic device of claim 6,
   wherein the at least one support dummy comprises:
   a first support dummy protruded from one side of the hinge cover based on a rotation axis of the hinge module; and
   a second support dummy protruded from another side of the hinge cover based on the rotation axis,
   wherein the FPCB is disposed between the first support dummy and the second support dummy, and
   wherein a disposition position thereof is determined by a protruding shape of the first support dummy and the second support dummy.

8. The electronic device of claim 5, wherein at least a portion of the first reinforcing member is disposed at a position corresponding to the inner space.

9. The electronic device of claim 5, wherein at least a portion of the second reinforcing member is disposed at a position corresponding to the inner space.

10. The electronic device of claim 5, wherein in a flat state, the inner space is closed through the first hinge plate and the second hinge plate.

11. The electronic device of claim 1, wherein at least a portion of the first reinforcing member is disposed to receive support of the first housing.

12. The electronic device of claim 1, wherein at least a portion of the second reinforcing member is disposed to receive support of the second housing.

13. The electronic device of claim 1,
   wherein the first housing comprises a first support member connected to the first hinge plate,
   wherein the second housing comprises a second support member connected to the second hinge plate, and
   wherein, in a flat state, the first support member, the first hinge plate, the second hinge plate, and the second support member form the same plane.

14. The electronic device of claim 13,
   wherein the first reinforcing member is disposed between at least a portion of the first hinge plate and at least a portion of the first support member, and
   wherein the second reinforcing member is disposed between at least a portion of the second hinge plate and at least a portion of the second support member.

15. The electronic device of claim 1, wherein the FPCB is disposed to electrically connect a first substrate disposed in a first space of the first housing and a second substrate disposed in a second space of the second housing.

16. An electronic device comprising:
   a first housing;
   a second housing;
   a hinge module configured to connect the first housing and the second housing in a foldable manner;

a first hinge plate configured to connect at least a portion of the first housing to the hinge module, the first hinge plate including a first opening;

a second hinge plate configured to connect at least a portion of the second housing to the hinge module, the second hinge plate including a second opening;

a flexible printed circuit board (FPCB) extending from the first housing to the second housing;

a first reinforcing member configured to fix a first portion of the FPCB with respect to the first hinge plate; and a second reinforcing member configured to fix a second portion of the FPCB with respect to the second hinge plate, wherein the first portion of the FPCB and at least a portion of the first reinforcing member are disposed within the first opening and the second portion of the FPCB and at least a portion of the second reinforcing member are disposed within the second opening, wherein the FPCB includes a third portion disposed between the first portions and the second portion, and wherein the third portion is bended in a U-shape behind the first and second hinge plates in a spaced apart manner.

17. The electronic device of claim 16, further comprising:

a hinge cover including an inner space at least partially accommodating the hinge module, wherein the third portion of the FPCB is disposed in the inner space of the hinge cover.

18. The electronic device of claim 17, wherein the third portion of the FPCB is unattached to the hinge housing.

19. The electronic device of claim 17, wherein the hinge cover comprises at least one support dummy protruded from an area at least partially overlapped with the FPCB received in the inner space, when viewed from above a flexible display, wherein the at least one support dummy comprises:

a first support dummy protruded from one side of the hinge cover based on a rotation axis of the hinge module; and a second support dummy protruded from another side of the hinge cover based on the rotation axis, wherein the FPCB is disposed between the first support dummy and the second support dummy, and wherein a disposition position thereof is determined by a protruding shape of the first support dummy and the second support dummy.

20. The electronic device of claim 16, wherein at least a portion of the first reinforcing member is disposed to receive support of the first housing and at least a portion of the second reinforcing member is disposed to receive support of the second housing.

* * * * *